United States Patent [19]

Okumura et al.

[11] Patent Number: 5,770,664
[45] Date of Patent: Jun. 23, 1998

[54] CATALYST COMPONENT FOR PRODUCING POLYOLEFIN, CATALYST FOR PRODUCING POLYOLEFIN COMPRISING THE CATALYST COMPONENT, AND PROCESS FOR PRODUCING POLYOLEFIN IN THE PRESENCE OF THE CATALYST

[75] Inventors: Yoshikuni Okumura; Nobuyuki Kibino; Tetsuya Maki; Akihiro Hori; Kiyotaka Ishida; Shigenobu Miyake; Shintaro Inazawa, all of Oita, Japan

[73] Assignee: Japan Polyolefins Co., Ltd., Tokyo, Japan

[21] Appl. No.: 855,510

[22] Filed: May 13, 1997

Related U.S. Application Data

[63] Continuation of Ser. No. 542,706, Oct. 13, 1995, abandoned.

[30] Foreign Application Priority Data

Oct. 13, 1994 [JP] Japan ..................................... 6-248130

[51] Int. Cl.$^6$ ........................................................ C08F 4/64
[52] U.S. Cl. ........................ 526/127; 526/160; 526/943; 526/133; 526/150; 526/153; 526/352; 526/351; 526/348.2
[58] Field of Search .................................... 526/943, 127, 526/160, 133, 150, 153

[56] References Cited

U.S. PATENT DOCUMENTS

| 4,939,217 | 7/1990 | Stricklen | 526/114 |
| 5,329,031 | 7/1994 | Miyake et al. | 556/12 |
| 5,391,789 | 2/1995 | Rohrmann | 556/11 |
| 5,401,817 | 3/1995 | Palackal et al. | 526/127 |
| 5,436,305 | 7/1995 | Alt et al. | 526/160 |
| 5,516,848 | 5/1996 | Canich et al. | |

FOREIGN PATENT DOCUMENTS

| 0524624A2 | 1/1993 | European Pat. Off. |
| 0528287A1 | 2/1993 | European Pat. Off. |
| 0576970A1 | 1/1994 | European Pat. Off. |

*Primary Examiner*—Mark Nagumo
*Attorney, Agent, or Firm*—Sughrue, Mion, Zinn, Macpeak & Seas, PLLC

[57] ABSTRACT

A catalyst component for producing polyolefin, a catalyst for producing polyolefin using the catalyst component, and a process for producing polyolefin in the presence of the catalyst. The catalyst component comprises a metallocene compound represented by formula (1):

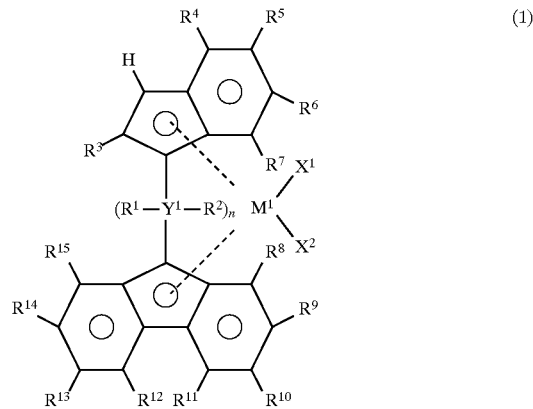

All the symbols in formula (1) are defined in the description.

14 Claims, 5 Drawing Sheets

CATALYST COMPONENT FOR PRODUCING POLYOLEFIN, CATALYST FOR PRODUCING POLYOLEFIN COMPRISING THE CATALYST COMPONENT, AND PROCESS FOR PRODUCING POLYOLEFIN IN THE PRESENCE OF THE CATALYST

This is a Continuation of application Ser. No. 08/542,706 filed Oct. 13, 1995 now abandoned.

FIELD OF THE INVENTION

The present invention relates to a catalyst component for producing polyolefin, a catalyst for producing polyolefin comprising the catalyst component, and a process for producing polyolefin in the presence of the catalyst. More particularly, the present invention relates to a catalyst component capable of selectively polymerizing (1) an ethylene polymer having a high melt tension, (2) an ethylenic copolymer having a uniform comonomer distribution and (3) a poly($\alpha$-olefin) elastomer, particularly polypropylene elastomer and polymer containing it, depending on the kind of olefin to be polymerized, a catalyst comprising the catalyst component, and a process for producing polyolefin in the presence of the catalyst component.

The polymer obtained according to the present invention can be widely used in many fields, including automobile industry, appliance industry, building industry and civil engineering and construction industry.

BACKGROUND OF THE INVENTION (1) Ethylenic polymer

It is known that an ethylenic polymer needs to have an enhanced melt tension (MT) to enhance its moldability. To this end, studies have been made of the enhancement of the melt tension of an ethylenic polymer obtained by polymerization in the presence of a Ziegler type titanium catalyst or Phillips type chromium catalyst. For example, a method for the improvement of an ethylenic polymer obtained by polymerization in the presence of a Ziegler type catalyst which comprises the enhancement of its melt tension is disclosed in JP-A-56-90810 and JP-A-60-106806 (The term "JP-A" as used herein means an "unexamined published Japanese patent application"). Although an ethylenic polymer obtained by polymerization in the presence of a Ziegler type catalyst or Phillips type catalyst can be improved in melt tension, it is disadvantageous in that it has a broad molecular weight distribution and hence a great content of low molecular weight components which can be extracted with hexane, causing fuming during forming.

An ethylenic polymer obtained by polymerization in the presence of a metallocene catalyst system made of a metallocene compound and methyl aluminoxane has a narrow molecular weight distribution and has a small content of low molecular weight components, causing less fuming during molding. However, such an ethylenic polymer obtained by polymerization in the presence of a metallocene catalyst system is disadvantageous in that it exhibits a low melt tension and hence a poor moldability.

In order to solve the foregoing problem, a method for improving the melt tension of polymers obtained by polymerization in the presence of a metallocene catalyst system has been studied. For example, JP-A-4-213306, JP-A-5-140224 and JP-A-5-140225 disclose a method for producing an olefin polymer in the presence of a solid catalyst comprising a crosslinked metallocene compound having a specific structure and an organic aluminoxy compound. The use of such a polymerization method provides an improvement in the melt tension of the polymer (In the examples disclosed, when ethylenebisindenyl zirconium compounds are used as metallocene compounds, remarkable effects can be actually recognized). However, the systems disclosed in these patents cannot provide polymers having a sufficient molecular weight, making it difficult to control the molecular weight of the resulting polymer by controlling the polymerization conditions such as hydrogen content. In particular, it is difficult to produce a polymer having a molecular weight as small as not more than 0.1 in MFR (melt flow rate, JIS K-6301) equivalence. Thus, this polymerization method can hardly be applied to multi-stage polymerization. Further, the polymer thus obtained has an insufficient molecular weight when used as a polyolefin modifier.

Further, JP-A-5-345793 discloses the polymerization of ethylene in the presence of a specific crosslinked indene-fluorene metallocene compound. However, the polymer thus produced disadvantageously has a low melt tension and a poor moldability as obtained by polymerization in the presence of the conventional metallocene compounds.

Thus, a method has been desired for producing a high molecular weight ethylenic polymer having a high melt tension.

(2) Ethylenic copolymer

With respect to an ethylenic copolymers, it is known that the molecular weight of the polymer and the comonomer composition distribution in the polymer chain are important factors influencing the properties of the polymer. In particular, high molecular weight components having a uniform comonomer distribution has a great effect on the improvement in the final properties (e.g., ESCR, rigidity, impact resistance) of the product (JP-B-61-43378, *Macromol. Chem., Macromol. Symp.*, vol.41, p.55 (1991), *J. Polym. Sci.*: Part B, vol. 29, p. 129 (1991)). (The term "JP-B" as used herein means an "examined Japanese patent publication") In general, an ethylenic copolymer produced by polymerization in the presence of a Ziegler-Natta catalyst can maintain its properties because of the presence of such a high molecular component. However, the comonomer composition distribution in the polymer chain is block-like, giving polymer with a higher degree of crystallization that adversely affects the final product.

The use of a metallocene catalyst system provides a remarkable improvement in the uniformity of the comonomer distribution in the polymer chain. However, the use of a zirconocene/methyl aluminoxane catalyst system which has early been developed cannot provide a polymer with a sufficient molecular weight. An attempt to increase the molecular weight of an ethylenic copolymer by improving the metallocene compound in the metallocene catalyst system is disclosed in U.S. Pat. No. 5,001,205, JP-A-5-148317, etc. However, the metallocene catalyst systems disclosed therein leave something to be desired in the molecular weight of the resulting polymer, particularly taking into account the application as a high molecular weight component for improving the foregoing final properties of the product.

If a metallocene catalyst system can be proposed that enables the production of a polymer with a higher molecular weight while maintaining the uniformity of the comonomer composition distribution in the polymer chain, it is of great industrial value.

(3) Polypropylene elastomer

It has been known since first reported by Natta et al. that among polypropylenes are those having elastic properties (polypropylene elastomer).

U.S. Pat. No. 4,335,225, *Macromolecules*, vol. 22, p. 3851 (1989), ibid, vol. 22, p. 3858 (1989), *J. Polym. Sci. Part A*:, vol. 27, p. 3063 (1989), JP-B-63-26122, JP-A-2-206608, JP-A-2-206633,and JP-A-7-90010 propose polypropylene elastomer that which give a high molecular weight atactic component in the component extracted with diethyl ether and thus can exhibit elastomeric properties. However, the catalyst system disclosed therein is a catalyst system having a problem in that an alkyl complex of Ti or Zr supported on alumina has a remarkably low activity.

In recent years, methods have been reported for the polymerization of propylene in the presence of a metallocene catalyst system which comprise direct polymerization to produce a polypropylene elastomer. The elastomer obtained by polymerization in the presence of this catalyst requires no separation process. Chien et al. obtained a thermoplastic elastomer by the polymerization of propylene in the presence of a crosslinked indene-cyclopentanediene metallocene compound (British Patent 2241244, *J. Am. Chem. Soc.*, vol. 112, p. 2030 (1990), *Macromolecules*, vol. 24, p. 850 (1991), *J. Am. Chem. Soc.*, vol. 113, p. 8569 (1991), *Macromolecules*, vol. 25, p. 7400 (1992), ibid, vol. 25, p. 1242 (1992), *J. Polym. Sci. Part A*: vol. 30, p. 2601 (1992)). Waymouth et al. obtained a thermoplastic elastomer polypropylene by the polymerization in the presence of a non-crosslinked bisindene metallocene compound (*Science*, vol. 267, p. 217 (1995)). However, these methods are disadvantageous in that a polymer having a sufficient molecular weight cannot be obtained at a practically effective polymerization temperature. It is known that the elastomeric properties are associated with the primary structure and molecular weight of the polymer. The foregoing metallocene catalyst systems which cannot provide a sufficient molecular weight impose a remarkable restriction on the properties of the polymer.

A polymerization method is disclosed for producing a substantially amorphous high molecular weight atactic polypropylene in the presence of a crosslinked bislfluorene metallocene compound (JP-A-6-234813, JP-A-6-256369) or monocyclopentanedienyl complex (WO95/00562). It is also reported that the atactic polypropylene thus obtained has elastomeric properties. However, the polymer thus obtained disadvantageously exhibits a small tensile strength and hence poor properties as an elastomer. Thus, the foregoing method can hardly control the polymer properties by controlling the polymerization conditions.

With respect to crosslinked indene-fluorene metallocene compounds, a metallocene compound having unsubstituted indene ring and fluorene ring is disclosed (JP-A-5-345793, *Organometallics*, vol. 13, p. 647 (1994)). However, polypropylenes thus produced have an extremely low molecular weight and thus are obtained in the form of oil or wax rather than thermoplastic elastomer.

SUMMARY OF THE INVENTION

It is therefore an object of the present invention to provide a metallocene catalyst system capable of selectively producing (1) a high molecular ethylenic polymer having a high melt tension, (2) a high molecular ethylenic copolymer having a uniform comonomer composition distribution and (3) a poly(α-olefin) elastomer, particularly polypropylene elastomer and polymer containing it, depending on the kind of olefin to be polymerized.

The foregoing three polymers are keenly desirable in the industry. If these polymers can be produced by using the same catalyst system, it is extremely favorable from the standpoint of production cost. It is also made possible to produce a high-performance resin in a multi-stage polymerization process wherein a plurality of polymers are produced in a single polymerization vessel.

Other objects and effects of the present invention will be apparent from the following description.

The present inventors made extensive studies on the foregoing problems. As a result, it was found that among crosslinked metallocene compounds having indene ring and fluorene ring a metallocene compound having specific substituents can be an extremely excellent catalyst component that provides the solution to the foregoing problems. Thus, the present invention has been completed.

The present invention relates to, as a first aspect, a catalyst component for producing polyolefin, the catalyst component comprising a metallocene compound represented by formula (1):

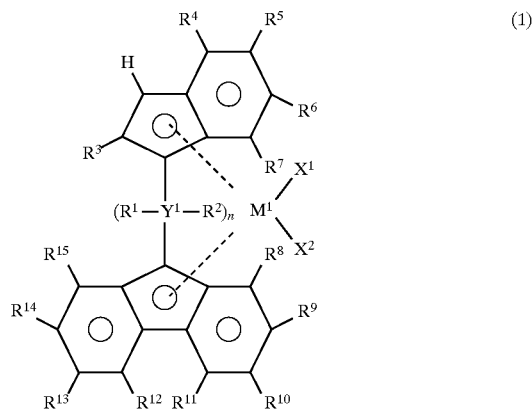

wherein $M^1$ represents a transition metal atom selected from Ti, Zr, and Hf;

$X^1$ and $X^2$ may be the same or different and each represent a hydrogen atom, a halogen atom, a hydrocarbon group having from 1 to 20 carbon atoms which may contain a halogen atom, an OR group, an SR group, an OCOR group, an $SO_2R$ group, an $OSO_2R$ group, or an NRR' group, in which R and R' may be the same or different and each represent a hydrogen atom or a hydrocarbon group having from 1 to 7 carbon atoms which may contain a halogen atom;

$R^1$ and $R^2$ may be the same or different and each represent a hydrogen atom, a hydrocarbon group having from 1 to 20 carbon atoms, an OR group, or an SR group, in which R represents a hydrogen atom or a hydrocarbon group having from 1 to 7 carbon atoms which may contain a halogen atom, $R^1$ and $R^2$ may be connected to each other to form a ring;

$R^3$ represents a hydrocarbon group having from 1 to 5 carbon atoms which may contain a silicon atom;

$R^4$ represents a hydrocarbon group having from 1 to 20 carbon atoms which may contain a silicon atom;

$R^5$ to $R^{15}$ may be the same or different and each represent a hydrogen atom or a hydrocarbon group having from 1 to 20 carbon atoms which may contain a silicon atom, $R^5$ to $R^{15}$ may be connected to each other to form a ring;

$Y^1$ represents a carbon atom, a silicon atom, or a germanium atom; and n represents an integer of from 1 to 3.

In a preferred embodiments of the first embodiment of the present invention, $R^3$ represents a methyl group or an ethyl group; and $R^4$ represents a methyl group, an ethyl group, an n-propyl group, an i-propyl group, or an aryl group having from 6 to 20 carbon atoms, or $R^3$ represents a methyl group or an ethyl group; $R^4$ represents a phenyl group or a 1-naphthyl group; $R^5$ to $R^{15}$ each represent a hydrogen atom; and n is 1.

The present invention also relates to, as a second aspect, a catalyst for producing polyolefin, the catalyst comprising:

(A) the above catalyst component of the first aspect of the present invention;

(B) a Lewis acid compound; and (C) an organoaluminum compound.

In a preferred embodiment for the second aspect, the catalyst further comprises (D) a particulate carrier.

The present invention further relates to, as a third aspect, a process for producing a polyolefin, the process comprising the step of homopolymerizing ethylene or copolymerizing ethylene and at least one of olefin represented by formula (2):

$$R^{16}\text{—}CH\text{=}CH\text{—}R^{17} \qquad (2)$$

wherein $R^{16}$ and $R^{17}$ may be the same or different and each represents a hydrogen atom or a hydrocarbon group having from 1 to 14 carbon atoms other than ethylene, $R^{16}$ and $R^{17}$ may be connected to each other to form a ring, in the presence of the polyolefin production catalyst of the second aspect of the present invention.

The present invention further relates to, as a fourth aspect, a process for producing a polyolefin, said process comprising the step of polymerizing one of olefin represented by formula (2) or copolymerizing two or more of olefins represented by formula (2), in the presence of a catalyst comprising:

(A) the above catalyst component of the first aspect of the present invention;

(B) a Lewis acid compound; and (C) an organoaluminum compound, or the catalyst comprising:

(A-1) the above catalyst component of the first aspect of the present invention;

(A-2) an auxiliary metallocene compound for the polymerization of a crystalline polyolefin;

(B) a Lewis acid compound; and (C) an organoaluminum compound.

In a preferred embodiment for the fourth aspect, the catalyst further comprises (D) a particulate carrier.

DETAILED DESCRIPTION OF THE INVENTION

Figure 1:
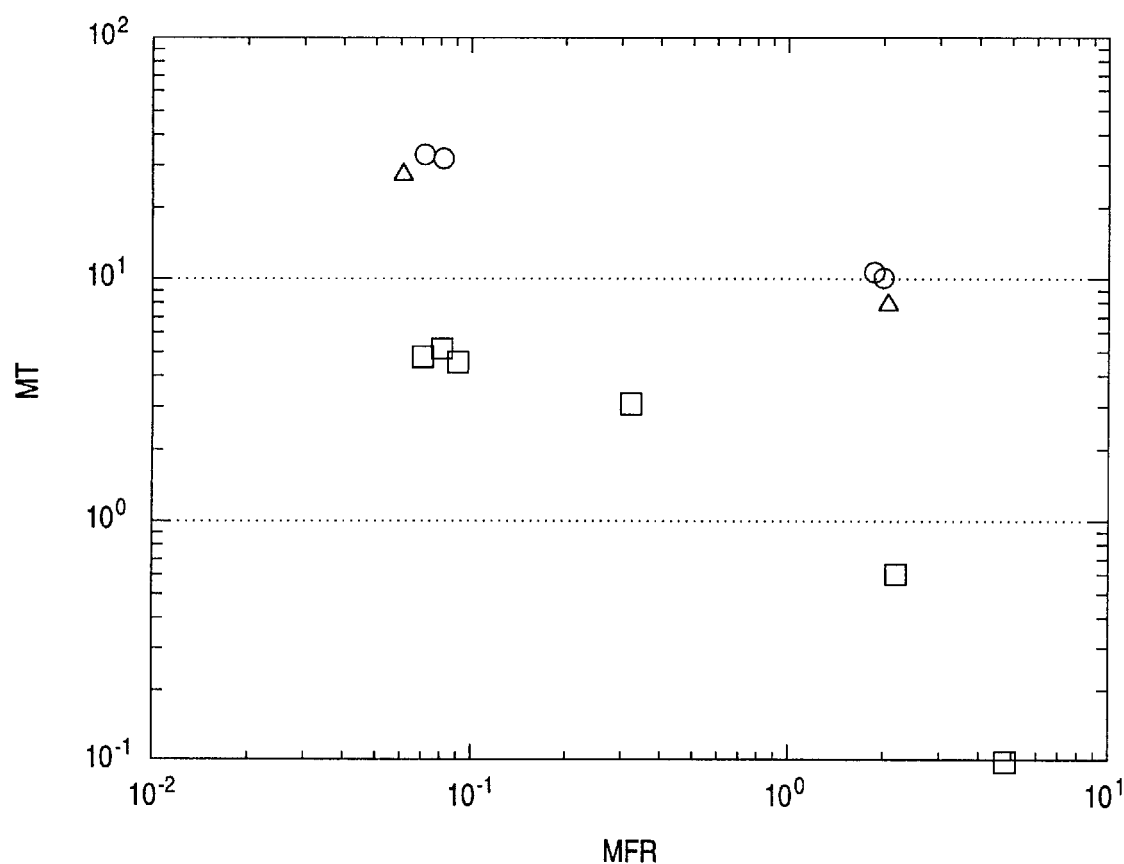
FIG. 1 shows the relationship between the melt tension (MT) and the melt flow rate (MFR) of ethylenic polymers in Examples and Comparative Examples.

The process for producing a polyolefin in the presence of a catalyst for producing a polyolefin (hereinafter sometimes referred to as olefin polymerization catalyst) according to the present invention will be further described hereinafter.

The novel metallocene compound which is a first catalyst component in the polymerization process of the present invention is represented by formula (1). Formula (1) will be further described hereinafter.

$R^3$ represents a $C_{1\text{-}5}$ hydrocarbon group which may contain a silicon atom. Specific examples of such a $C_{1\text{-}5}$ hydrocarbon group include an alkyl group such as methyl, ethyl, n-propyl, i-propyl, n-butyl, i-butyl, t-butyl, n-pentyl and cyclopentyl; and an alkylsilyl group such as trimethylsilyl. $R^3$ is preferably selected from the group consisting of methyl, ethyl, n-propyl and i-propyl.

The expressions "$C_{1\text{-}5}$" and the like used herein means "having from 1 to 5 carbon atoms" and the like.

$R^4$ represents a $C_{1\text{-}20}$ hydrocarbon group which may contain a silicon atom. Specific examples of such a $C_{1\text{-}20}$ hydrocarbon group include an alkyl group such as methyl, ethyl, n-propyl, i-propyl, n-butyl, i-butyl, t-butyl, n-pentyl, cyclopentyl, cyclohexyl, octyl, nonyl and adamantyl; alkenyl group such as vinyl and propenyl; an aryl group such as phenyl, tollyl, 2,6-dimethylphenyl, 2,4,6-trimethylphenyl, naphthyl and anthracenyl; an arylalkyl group such as benzyl, phenylmethyl, diphenylmethyl, triphenylmethyl and phenylethyl; an alkylsilyl group such as methylsilyl, dimethylsilyl and trimethylsilyl; and a silylalkyl group such as tris(trimethylsilyl)methyl. Preferred among these hydrocarbon groups is one having a primary or secondary carbon atom at the α-position, such as an alkyl group (e.g., methyl, ethyl, n-propyl, i-propyl, n-butyl, i-butyl) and an aryl group (e.g., phenyl, tollyl, 2,6-dimethylphenyl, 2,4, 6-trimethylphenyl, naphthyl, anthracenyl). Particularly preferred among these hydrocarbon groups is an alkyl group such as methyl, ethyl and i-propyl, and an aryl group such as phenyl and 1-naphthyl.

In the metallocene compound represented by formula (1) of the present invention, it is important that both $R^3$ and $R^4$ are not a hydrogen atom and the indene ring has a hydrogen atom at the 3-position. If $R^3$ and $R^4$ are a hydrogen atom at the same time or the indene ring has no hydrogen atom at the 3-position, the effects of the present invention cannot be exerted.

$R^5$ to $R^{15}$ may be the same or different and each represent a hydrogen atom or a $C_{1\text{-}20}$ hydrocarbon group which may contain a silicon atom. In other words, $R^5$ to $R^{15}$ each represent a hydrogen atom or has the same meaning as $R^4$. $R^5$ to $R^{15}$ may be connected to each other to form a ring. In particular, neighboring groups are preferably connected to each other to form an aromatic 6-membered ring. For example, it is preferred that, in formula (1), the indene ring is 4,5-benzoindene, 5,6-benzoindene or 6,7-benzoindene, and the fluorene ring is 1,2-benzofluorene, 2,3-benzofluorene, 3,4-benzofluorene, 5,6-benzofluorene, 6,7-benzofluorene, 7,8-benzofluorene, 3,4,5,6-dibenzofluorene or 4,5-methylenephenanthrene. The indene ring is particularly preferably 4,5-benzoindene.

$X^1$ and $X^2$ may be the same or different and each represent a hydrogen atom, halogen atom, $C_{1\text{-}20}$ hydrocarbon group which may contain a halogen atom, an OR group, an SR group, an OCOR group, an $SO_2R$ group, an $OSO_2R$ group, or an NRR' group (in which R and R' may be the same or different and each represent a hydrogen atom or a $C_{1\text{-}7}$ hydrocarbon group which may contain a halogen atom). For example, the halogen atom represents fluorine, chlorine, bromine or iodine. The $C_{1\text{-}20}$ hydrocarbon group which may contain halogen atom may represent an alkyl group such as methyl, ethyl, n-propyl, i-propyl, n-butyl, i-butyl, t-butyl, n-pentyl, cyclopentyl and cyclohexyl; an alkenyl group such as vinyl and propenyl; an aryl group such as phenyl, tollyl, 2,6-dimethylphenyl and 2,4,6-trimethylphenyl; an arylalkyl group such as benzyl, phenylmethyl, diphenylmethyl, triphenylmethyl and phenylethyl; a halogenated alkyl group such as trifluoromethyl; or a halogenated aryl group such as pentafluorophenyl. The OR group may represent a hydroxyl group; an alkoxy group such as methoxy, ethoxy, propoxy and butoxy; or an aryloxy group such as phenoxy. The SR group may represent a mercapto group; an alkylthio group such as methylthio; or an arylthio group such as phenylthio. The OCOR group may represent a carboxyl group or an alkoxycarbonyl group such as methoxycarbonyl. The $SO_2R$ group may represent a sulfino group; an alkylsulfino group such as methylsulfino; or an arylsulfino group such as phenylsulfino. The $OSO_2R$ group may represent a sulfo group; an alkylsulfo group such as methylsulfo; or an arylsulfo group such as phenylsulfo and p-toluenesulfo. The NRR' group may represent an amino group; an alkylamino group such as methylamino, dimethylamino, diethylamino and dibutylamino; or an arylamino group such as phenylamino. $X^1$ and $X^2$ are preferably selected from a halogen atom and an alkyl group such as methyl.

$R^1$ and $R^2$ may be the same or different and each represent a hydrogen atom, a $C_{1-20}$ hydrocarbon group, an OR group or an SR group (in which R represents a hydrogen atom or a $C_{1-7}$ hydrocarbon group which may contain a halogen atom). $R^1$ and $R^2$ may be connected to each other to form a ring. For example, the $C_{1-20}$ hydrocarbon group may represent an alkyl group such as methyl, ethyl, n-propyl, i-propyl, n-butyl, i-butyl, t-butyl, n-pentyl, cyclopentyl and cyclohexyl; an alkenyl group such as vinyl and propenyl; an aryl group such as phenyl, tollyl, 2,6-dimethylphenyl and 2,4,6-trimethylphenyl; or an arylalkyl group such as benzyl, phenylmethyl, diphenylmethyl, triphenylmethyl and phenylethyl. The OR group may represent a hydroxyl group; an alkoxy group such as methoxy, ethoxy, propoxy and butoxy; or an aryloxy group such as phenoxy. The SR group may represent a mercapto group; an alkylthio group such as methylthio; or an arylthio group such as phenylthio. $R^1$ and $R^2$ are preferably selected from methyl, ethyl and phenyl.

$Y^1$ represents a carbon atom, a silicon atom, or a germanium atom.

In the crosslinking moiety represented by $(R^1-Y^1-R^2)_n$, n is preferably 1. $R^1$ and $R^2$ may be connected to each other via $Y^1$ to form a ring, and for example, a 1,1-cyclohexylidene ring is preferred.

Examples of the metallocene compound of the present invention include:
$Me_2Si[2-Me-4-(1-Naph)Ind](Flu)ZrCl_2$,
$Me_2Si[2-Et-4-(1-Naph)Ind](Flu)ZrCl_2$,
$iPr[2-Me-4-(1-Naph)Ind](Flu)ZrCl_2$,
$Me_2Si[2-Me-4-PhInd](Flu)ZrCl_2$,
$Me_2Si[2-Et-4-PhInd](Flu)ZrCl_{21}$
$iPr[2-Me-4-PhInd](Flu)ZrCl_2$,
$Me_2Si[2-Me-4-iPrInd](Flu)ZrCl_2$,
$Me_2Si[2-Et-4-iPrInd](Flu) ZrCl_2$,
$iPr[2-Me-4-iPrInd](Flu)ZrCl_2$,
$Me_2Si[2-Me-4-EtInd](Flu) ZrCl_2$,
$iPr[2-Me-4-EtInd](Flu)ZrCl_2$,
$Me_2Si[2,4-Me_2Ind](Flu) ZrCl_2$,
$iPr[2,4-Me_2Ind](Flu)ZrCl_2$,
$Me_2Si[2,4,7-Me_3Ind](Flu)ZrCl_2$,
$iPr[2,4,7-Me_3Ind](Flu)ZrCl_2$,
$Me_2Si[2-Me-4,6-iPr_2Ind](Flu)ZrCl_2$,
$iPr[2-Me-4,6-iPr_2Ind](Flu)ZrCl_2$,
$Me_2Si[2-MeBenzind](Flu) ZrCl_2$,
$iPr[2-MeBenzind](Flu)ZrCl_2$,
$Me_2Si[2-Me-4-(1-Naph)Ind](2,7-tBu_2Flu)ZrCl_2$,
$iPr[2-Me-4-(1-Naph)Ind](2,7-tBu_2Flu)ZrCl_2$,
$MePhSi[2-Me-4-(1-Naph)Ind](Flu)ZrCl_2$,
$Ph_2Si[2-Me-4-(1-Naph)Ind](Flu)ZrCl_2$,
$Me_2Ge[2-Me-4-(1-Naph)Ind](Flu)ZrCl_2$, and the corresponding titanium and hafnium compounds.

Particularly preferred among these metallocene compounds are:
$Me_2Si[2-Me-4-(1-Naph)Ind](Flu)ZrCl_2$,
$iPr[2-Me-4-(1-Naph)Ind](Flu)ZrCl_2$,
$Me_2Si[2-Me-4-PhInd](Flu)ZrCl_2$, and
$iPr[2-Me-4-PhInd](Flu)ZrCl_2$.

In the foregoing formulae, Me represents a methyl group, Et represents an ethyl group, iPr represents an isopropyl group, tBu represents a t-butyl group, Ph represents a phenyl group, Naph represents a naphthyl group, Ind represents an indenyl group, Benzind represents a 4,5-benzoindenyl group, Flu represents a fluorenyl group, Si[ ] represents a silylene group, iPr[ ] represents an isopropylydene group, Ge[ ] represents a germylene group, Zr represents a zirconium atom, and Cl represents a chlorine atom.

The numerals indicating the position of substituents on the indene ring and the fluorene ring in formula (1) are shown in formula (5).

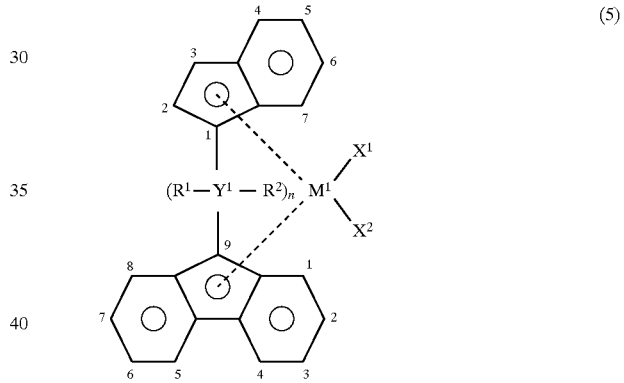

(5)

The foregoing metallocene compounds of the present invention may be used singly or in combination of two or more thereof.

Typical examples of the synthesis route of the metallocene compound of the present invention will be outlined below, but the present invention should not be construed as being limited thereto.

As the substituted indene to be used as a starting material, commercial products may be used. Alternatively, such a substituted indene can be synthesized by a known method. An example of the synthesis method will be given below.

The substituted indene can be synthesized in accordance with the synthesis method disclosed in *Organometallics*, vol. 13, p. 954 (1994):

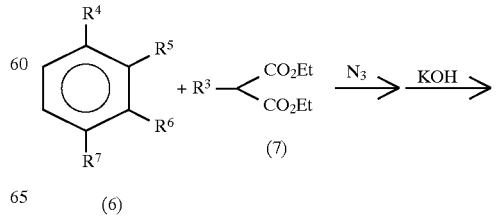

(6)  (7)

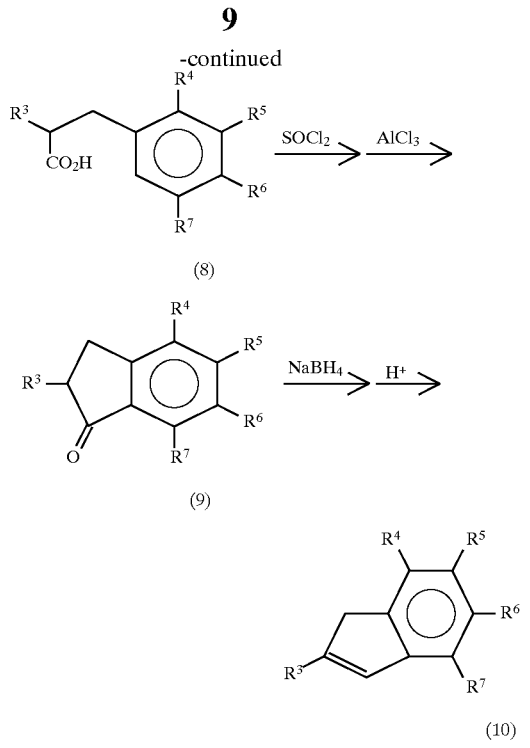

(8)

(9)

(10)

As the substituted fluorene of formula (11), which is used as the other starting material, commercial products may be used. If necessary, the substituted fluorene can be synthesized by a known technique:

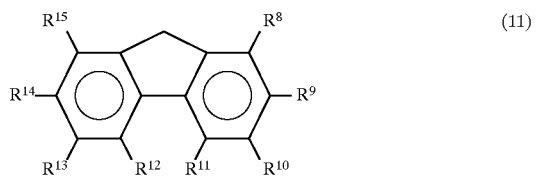

(11)

An indenyl anion of formula (12):

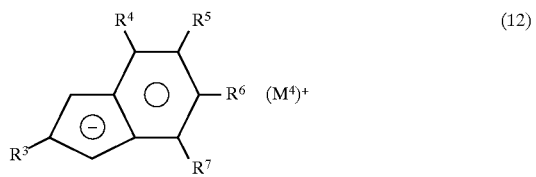

(12)

wherein $M^4$ represents an alkaline metal atom such as lithium, sodium and potassium, can be obtained by deprotonizing the substituted indene (10) in a solvent in the presence of n-butyl lithium, sodium hydride, potassium hydride or a strong base such as metallic sodium and metallic potassium.

The indenyl anion (12) thus produced is then reacted with a compound of formula (13):

(13)

wherein $X^7$ and $X^8$ may be the same or different and each represent a halogen atom, an OR group, an SR group, an OCOR group, an $OSO_2R$ group, or an NRR' group (in which R and R' each represent a hydrogen atom or a $C_{1-7}$ hydrocarbon group) to obtain a compound of formula (14):

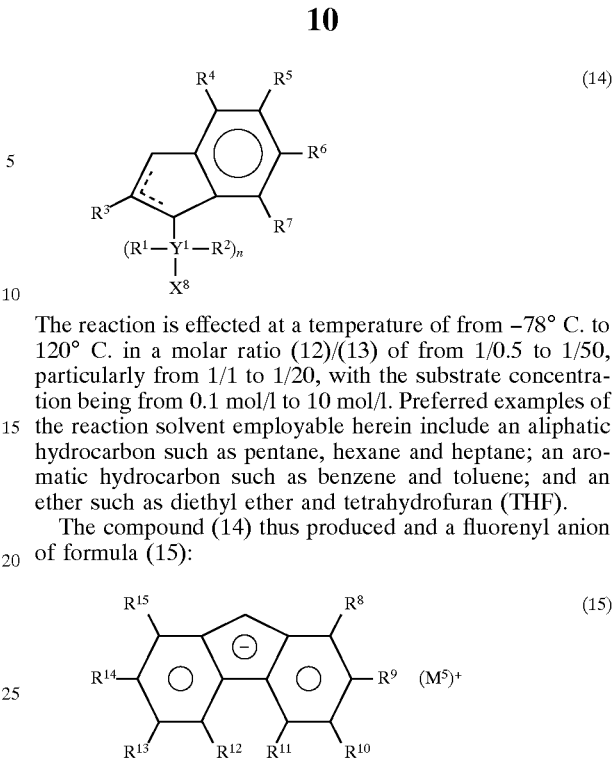

(14)

The reaction is effected at a temperature of from $-78°$ C. to $120°$ C. in a molar ratio (12)/(13) of from 1/0.5 to 1/50, particularly from 1/1 to 1/20, with the substrate concentration being from 0.1 mol/l to 10 mol/l. Preferred examples of the reaction solvent employable herein include an aliphatic hydrocarbon such as pentane, hexane and heptane; an aromatic hydrocarbon such as benzene and toluene; and an ether such as diethyl ether and tetrahydrofuran (THF).

The compound (14) thus produced and a fluorenyl anion of formula (15):

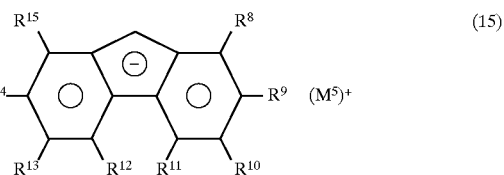

(15)

wherein $M^5$ represents an alkaline metal atom such as lithium, sodium and potassium, obtained by the deprotonization of the substituted fluorene (11) in the presence of the foregoing strong base, are reacted in a molar ratio (14)/(15) of from 1/0.5 to 1/50, particularly from 1/1 to 1/20 to obtain a compound of formula (16):

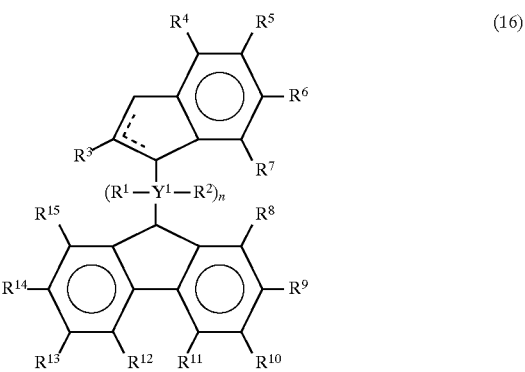

(16)

The reaction is effected at a temperature of from $-78°$ C. to $120°$ C., particularly from $-20°$ C. to $20°$ C., with the substrate concentration being from 0.1 mol/l to 10 mol/l. Preferred examples of the reaction solvent employable herein include an aliphatic hydrocarbon such as pentane, hexane and heptane; an aromatic hydrocarbon such as benzene and toluene; and an ether such as diethyl ether and tetrahydrofuran (THF).

The compound represented by formula (16), if n is 1 and $Y^1$ is a carbon atom, can be effectively synthesized by the following method.

The substituted indene (10) and a ketone of formula (17):

(17)

are reacted to obtain a substituted benzofulvene of formula (18):

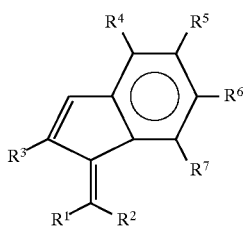
(18)

For example, the substituted indene (10) is allowed to be reacted with sodium ethoxide in ethanol, n-butyl lithium, sodium hydride, potassium hydride or strong base such as metallic sodium and metallic potassium, and then the ketone (17) is added in a molar ratio (10)/(17) of from 1/0.5 to 1/50, particularly from 1/1 to 1/20.

The substituted benzofulvene (18) and the substituted fluorene (12) are reacted in a molar ratio (18)/(12) of from 1/0.5 to 1/50, particularly from 1/1 to 1/20 to obtain a compound of formula (19):

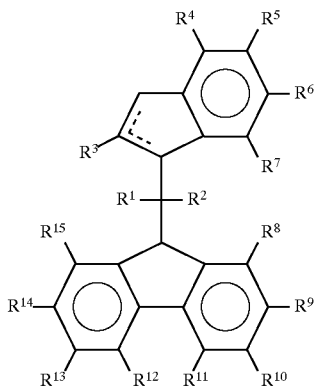
(19)

The compound (19) thus synthesized is then subjected to a method known in references (*J. Am. Chem. Soc.*, vol. 95, p. 6263 (1995), *Organometallics*, vol. 14, p. 5 (1995)) to obtain a metallocene compound.

For example, the compound (19) is deprotonized by the foregoing strong base to obtain a dianion of formula (20):

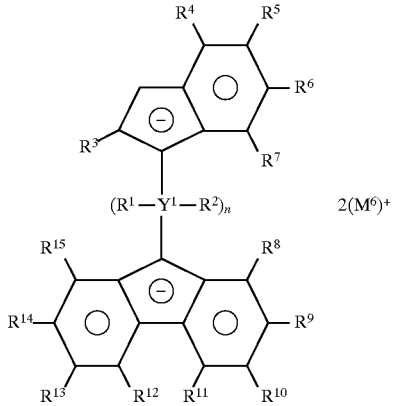
(20)

wherein $M^6$ represents an alkaline metal atom such as lithium, sodium and potassium.

The compound (16) or the dianion (20) is then reacted with a compound of formula (21):

(21)

wherein $X^1$ and $X^2$ may be the same or different and each represent a halogen atom, an OR group, an SR group, an OCOR group, an $OSO_2R$ group or an NRR' group (in which R and R' may be the same or different and each represent a hydrogen atom or a $C_{1-7}$ hydrocarbon group); and n represents an integer of from 1 to 3, to obtain a metallocene compound (1) (with the proviso that $X^1$ and $X^2$ are not an alkyl group). The reaction is effected at a temperature of from −78° C. to 120° C., particularly from −78° C. to 30° C., with the substrate concentration being from 0.01 mol/l to 10 mol/l. Preferred examples of the reaction solvent employable herein include an aliphatic hydrocarbon such as pentane, hexane and heptane; an aromatic hydrocarbon such as benzene and toluene; a halogenated hydrocarbon such as dichloromethane; and an ether such as diethyl ether and tetrahydrofuran (THF).

If $X^1$ and $X^2$ in formula (1) are hydrocarbon groups, the compound (16) or the dianion (20) is acted upon by an alkylating agent represented by formula (22):

$$R^{32}-M^7 \qquad (22)$$

wherein $R^{32}$ represents a $C_{1-20}$ hydrocarbon; and $M^7$ represents an alkaline metal atom such as lithium, sodium and potassium, to produce a metallocene compound represented by formula (1).

The catalyst for producing a polyolefin according to the present invention comprises (A) the catalyst component comprising the metallocene compound of the present invention, (B) a Lewis acid compound, and (C) an organoaluminum compound.

Examples of a Lewis acid compound as the second catalyst component (B) can be roughly divided into the following two groups.

One of the two groups is an organic aluminoxy compound represented by formula (23) or (24):

(23)

(24)

In formulae (23) and (24), $R^{33}$, $R^{34}$ and $R^{35}$ may be the same or different and each represent a hydrogen atom or a $C_{1-10}$ hydrocarbon group, preferably methyl, ethyl, n-propyl, i-propyl, n-butyl or i-butyl, particularly preferably methyl or i-butyl. The plurality of $R^{36}$ groups may be the same or different and each represent a $C_{1-10}$ hydrocarbon group, preferably methyl, ethyl, n-propyl, i-propyl, n-butyl or i-butyl, particularly preferably methyl or i-butyl. The suffix n represents an integer of from 1 to 100. Organic aluminoxy compounds represented by formula (23) or (24) wherein n is from 3 to 100 are preferably used in admixture. Alternatively, organic aluminoxy compounds represented by formulae (23) an d (24) may be used in admixture.

The preparation of these compounds can be accomplished by a known method. Examples of such a known method include a method which comprises the addition of a trialkyl aluminum to a suspension of a salt having water of crystallization (e.g., hydrated copper sulfate, hydrated aluminum sulfate) in a hydrocarbon solvent, and a method which comprises allowing the foregoing suspension to be acted upon by solid, liquid or gaseous water.

If n is 2 or more and the plurality of $R^{36}$ groups are the same, one trialkyl aluminum is used. If the plurality of $R^{36}$ groups are different, two or more kinds of trialkyl aluminum or one or more kinds of trialkyl aluminum and one or more kinds of dialkyl aluminum monohydrides may be used. Specific examples of these trialkyl aluminum and dialkyl aluminum monohydrides include a trialkyl aluminum such as trimethyl aluminum, triethyl aluminum, tri-n-propyl aluminum, tri-i-propyl aluminum, tri-n-butyl aluminum, tri-i-butyl aluminum, tri-s-butyl aluminum, tri-t-butyl aluminum, tripentylbutyl aluminum, trihexylbutyl aluminum and tricyclohexylbutyl aluminum; a dialkyl aluminum halide such as dimethyl aluminum chloride and di-i-butyl aluminum chloride; and a dialkyl aluminum aryloxide such as dimethyl aluminum methoxide. Preferred among these compounds is a trialkyl aluminum, particularly preferably trimethyl aluminum or tri-i-butyl aluminum.

The organic aluminoxy compound to be used in the present invention may be further reacted with a compound having active hydrogen such as water so that the organic aluminoxy compound of formula (23) or (24) is crosslinked. Alternatively, the organic aluminoxy compound to be used in the present invention may be a product of the addition reaction with an organic polar compound having in its molecule at least one atom selected from phosphorus, nitrogen, sulfur and oxygen, and free of active hydrogen. The foregoing organic aluminoxy compound may comprise an alcoholic additive or the like incorporated therein to inhibit its aging. Examples of the foregoing organic polar compound include trimethyl phosphate and triethyl phosphate. In the presence of such an organic aluminoxy compound, a polyolefin having excellent powder properties can be produced without causing the polymer to be attached to the wall of the polymerization vessel.

The other group of the second catalyst component is a Lewis acid compound that reacts with a metallocene compound to produce an ionic complex. Preferred examples of such a Lewis acid compound include an organoboron compound, particularly an organoboron compound having a pentafluorophenyl group, a p-methyltetrafluorophenyl group, a p-t-butyltetrafluorophenyl group or a p-trimethylsilyltetrafluorophenyl group. Specific examples of such an organoboron compound include tri(pentafluorophenyl)boron, tri(n-butyl)ammonium tetra(pentafluorophenyl)borate, dimethylanilium tetra(pentafluorophenyl)borate, pyridinium tetra(pentafluorophenyl)borate, ferrocenium tetra(pentafluorophenyl)borate, triphenylcarbenium tetra(pentafluorophenyl)borate, triphenylcarbenium tri(pentafluorophenyl) (4-methyl-2,3,5,6-tetrafluorophenyl)borate, triphenylcarbenium tri(pentafluorophenyl) (4-t-butyl-2,3,5,6-tetrafluorophenyl)borate, and triphenylcarbenium tri(pentafluorophenyl) (4-trimethylsilyl-2,3,5,6-tetrafluorophenyl)borate.

The third catalyst component (C) to be used in the polymerization process of the present invention is an organoaluminum compound. The organoaluminum compound may be selected from a trialkyl aluminum such as trimethyl aluminum, triethyl aluminum, tri-n-propyl aluminum, tri-i-propyl aluminum, tri-n-butyl aluminum, tri-i-butyl aluminum, tri-s-butyl aluminum, tri-t-butyl aluminum, tripentyl aluminum, trihexyl aluminum, trioctyl aluminum and tricyclohexyl aluminum; a dialkyl aluminum halide such as dimethyl aluminum chloride, diethyl aluminum chloride and di-i-butyl aluminum chloride; a dialkyl aluminum alkoxide such as dimethyl aluminum methoxide and diethyl aluminum ethoxide; a dialkyl aluminum alkoxide such as dimethyl aluminum methoxide and diethyl aluminum ethoxide; a dialkyl aluminum aryloxide such as diethyl aluminum phenoxide; and an aluminoxane. Preferred among these organoaluminum compounds is a trialkyl aluminum, particularly preferably trimethyl aluminum, triethyl aluminum, tri-i-butyl aluminum, and trioctyl aluminum. Such an organoaluminum compound may be replaced by an organic aluminoxy compound represented by formula (23) or (24).

The catalyst for producing a polyolefin according to the present invention may further be comprise (D) a particulate carrier.

The first, second and third catalyst components of the present invention can be all supported on the particulate carrier (D) (hereinafter singly referred to as "carrier") as the fourth catalyst component. The particulate carrier employable herein generally has an average particle diameter of from 10 to 300 μm, preferably from 20 to 200 μm. The particulate carrier to be used in the present invention is not specifically limited and can be selected from organic and inorganic substances so far as it is particulate and stays solid in the polymerization medium. If the particulate carrier is an inorganic substance, it is preferably selected from inorganic oxides, inorganic chlorides, inorganic carbonate, inorganic sulfates and inorganic hydroxides. If the particulate carrier is an organic substance, it is preferably from organic polymers.

Examples of the inorganic substance include oxides such as silica and alumina, chloride such as magnesium chloride, carbonate such as magnesium carbonate and calcium carbonate, sulfates such as magnesium sulfate and calcium sulfate, and hydroxide a such as magnesium hydroxide and calcium hydroxide. Examples of the organic substance include organic polymer carriers, and in particular, a particulate polyethylene or polystyrene can be exemplified. The particulate carrier is preferably selected from inorganic oxides, particularly silica, alumina and a complex thereof.

Among these materials, a porous particulate carrier is preferred. Such a porous particulate carrier is less attached to the inner wall of the reaction vessel, making it possible to provide a polymer having a higher bulk density. The porous particulate carrier used in the present invention preferably has a specific surface area of from 10 to 1,000 m$^2$/g, more preferably from 100 to 800 m$^2$/g, particularly preferably from 200 to 600 m$^2$/g. The pore volume of the porous particulate carrier is preferably from 0.3 to 3 cc/g, more preferably from 0.5 to 2.5 cc/g, particularly preferably from 1.0 to 2.0 cc/g.

The particulate carrier can have different water adsorption and surface hydroxyl group content with different treatment conditions. The particulate carrier preferably has a water content of not more than 5% by weight and a surface hydroxyl group content of not less than 1/nm$^2$ per surface area. The water content and surface hydroxyl group content can be controlled by controlling the calcining temperature or by treatment with an organoaluminum compound or an organic boron compound. Further, a particulate carrier which has been subjected to preliminary polymerization with an olefin can also be used.

The polymerization catalyst of the present invention may further comprise other components useful for the polymerization of olefin besides the foregoing components.

Examples of the olefin to be polymerized in the process for producing a polyolefin according to the present invention include ethylene, propylene, 1-butene, 1-pentene, 1-hexene, 1-heptene, 1-octene, 3-methyl-1-butene, 4-methyl-1-pentene, cyclopentene, cyclohexene, and styrene.

In the process of the present invention, it is preferred that ethylene is homopolymerized or ethylene and at least one of olefin represented by formula (2) are copolymerized:

$$R^{16}-CH\!=\!CH-R^{17} \qquad (2)$$

wherein $R^{16}$ and $R^{17}$ may be the same or different and each represents a hydrogen atom or a hydrocarbon group having from 1 to 14 carbon atoms other than ethylene, $R^{16}$ and $R^{17}$ may be connected to each other to form a ring.

It is also preferred that one of olefin represented by formula (2) is homopolymerized or two or more of olefins represented by formula (2) are copolymerized.

Examples of the olefin represented by formula (2) to be polymerized include propylene, 1-butene, 1-pentene, 1-hexene, 1-heptene, 1-octene, 3-methyl-1-butene, 4-methyl-l-pentene, cyclopentene, cyclohexene, and styrene. Preferred examples of the olefin represented by formula (2) to be copolymerized with ethylene include propylene, 1-butene, 1-hexene, and 1-octene. Particularly preferred among these olefins is propylene. In the polymerization or copolymerization of one or more olefins represented by formula (2), propylene is preferably homopolymerized, or alternatively, propylene is preferably copolymerized with 1-butene or 1-hexene. Particularly preferred among these polymers is propylene homopolymer.

Further, a polyvalent unsaturated hydrocarbon can be polymerized. Examples of the polyvalent unsaturated hydrocarbon to be polymerized include a $C_{5-80}$ polyvalent unsaturated hydrocarbon with a molecular weight of not more than 1,100 having a plurality of non-conjugated vinyl groups and at least two vinyl double bonds. A particularly effective unsaturated hydrocarbon has from 8 to 20 carbon atoms. Specific examples of such a polyvalent unsaturated hydrocarbon include 1,4-pentadiene, 1,5-hexadiene, 1,6-heptadiene, 1,7-octadiene, 1,8-nonodiene, 1,9-decadiene, 1,13-tetradecadiene, 3-methyl-1,4-pentadiene, 4-methyl-1,5-hexadiene, 3-methyl-1,5-hexadiene, and 1,5,9-decatriene. Particularly preferred among these are 1,5-hexadiene, 1,7-octadiene, and 1,9-decadiene. The proportion of the polyvalent unsaturated hydrocarbon to be polymerized is preferably from 0.05 to 2% by weight based on the amount of the olefin represented by formula (2).

The time at which the first catalyst component (A) (catalyst component comprising the metallocene compound of the present invention) is brought into contact with the other catalyst components (B) and (C) on the polymerization reaction may be arbitrarily selected. For example, the first catalyst component (A) and the second catalyst component (B) may be previously brought into contact with each other (pre-contact), and then added to the third catalyst component (C) and the olefin to be polymerized which had been charged into the reaction vessel to initiate the polymerization reaction. In an alternate method, the third catalyst component (C) and the olefin to be polymerized may be charged into the reaction vessel. The first catalyst component (A) and the second catalyst component (B) may then be separately charged into the reaction vessel to initiate the polymerization reaction. In particular, if the second catalyst component (B) is an organic aluminoxy compound represented by formula (23) or (24), the first catalyst component (A) and the second catalyst component (B) can be previously brought into contact with each other before being supplied into the reaction system, to provide a remarkable enhancement of polymerization activity.

The first, second and third catalyst components may be supported on the fourth catalyst component (D) at any time as necessary. The order of supporting these catalyst components on the fourth catalyst component may be arbitrarily selected. Preferably, the second catalyst component (B) may be mixed with the fourth catalyst component (D) so that they are brought into contact with each other. The first catalyst component (A) is then brought into contact with the mixture.

Alternatively, the first catalyst component (A) and the second catalyst component (B) may be previously brought into contact with each other. The fourth catalyst component (D) is then mixed with the mixture so that they are brought into contact with each other.

The above catalyst components may be mixed in a solvent such as an aromatic hydrocarbon (e.g., benzene, toluene, xylene), an aliphatic hydrocarbon (e.g., pentane, hexane, heptane, octane, decane), and an alicyclic hydrocarbon (e.g., cyclopentane, cyclohexane) in the presence or absence of olefin. The temperature at which these components are mixed is generally from $-70°$ C. to $200°$ C., preferably from $-20°$ C. to $120°$ C. The mixing time is generally from 1 to 600 minutes. When these catalyst components are mixed, the first catalyst component (A) is generally used in a concentration of from $10^{-6}$ to $10^{-3}$ mol per g of the fourth catalyst component (D).

The polymerization of the present invention can be accomplished by any method known in the art such as solution polymerization, slurry polymerization, gas phase polymerization, and high temperature melt polymerization. The polymerization of the present invention may be effected continuously or batchwise, and in one stage or a plurality of stages.

The polymerization conditions are not specifically limited except those specified in the process employed. The polymerization temperature is generally from $0°$ C. to $300°$ C., preferably from $20°$ C. to $150°$ C., more preferably from $40°$ C. to $90°$ C.

The concentration of the polyolefin polymerization catalyst component used in the process of the present invention is not particularly limited. The concentration of the metallocene compound as the first catalyst component (A) is preferably from $10^{-10}$ to $10^{-3}$ mol/l with respect to the solvent or reaction vessel volume. The concentration of the second catalyst component (B), if it is an organic aluminoxy compound represented by formula (24) or (25), is preferably from 10 to 10,000, particularly from 100 to 5,000 as calculated in terms of molar ratio of aluminum atom in the organic aluminoxy compound to metallocene compound. The concentration of the second catalyst component (B), if it is a Lewis acid compound in the other group, such as an organoboron compound, is preferably from 0.1 to 100, particularly from 0.2 to 10 as calculated in terms of molar ratio of Lewis acid compound to metallocene compound. With respect to the third catalyst component (C), the molar ratio of organoaluminum compound to metallocene compound as first catalyst component (A) is generally from 10 to 100,000, preferably from 100 to 10,000 as calculated in terms of aluminum atom in the organoaluminum compound.

The adjustment of the molecular weight of the resulting polymer can be accomplished by any known method, e.g., by properly selecting the polymerization temperature or introducing hydrogen into the polymerization system.

The olefin polymerization catalyst of the present invention may be used in combination with other olefin polymerization catalysts.

In the case where ethylene is polymerized or ethylene and one or more olefins represented by formula (2) are copolymerized, the metallocene compound of the present invention can be used in combination with other known metallocene compounds to produce ethylene polymers having different molecular weight distributions.

In the case where one or more olefins represented by formula (2) are polymerized or copolymerized, the metallocene compound of the present invention can be used in combination with an auxiliary metallocene compound for the polymerization of a crystalline polyolefin, particularly crystalline polypropylene, to provide further improvement in the elastic properties of the resulting polymer.

Examples of the auxiliary metallocene compound for the polymerization of a crystalline polypropylene to be used in the present invention include compounds represented by formulae (3) and (4):

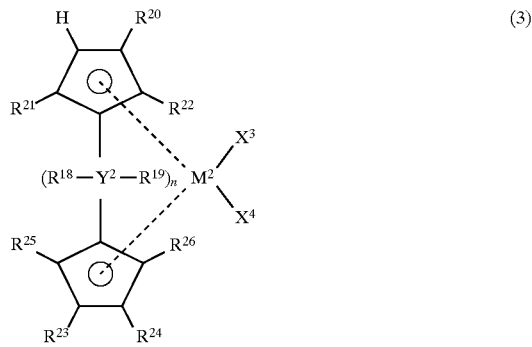
(3)

wherein $M^2$ represents a transition metal atom selected from Ti, Zr, and Hf; $X^3$ and $X^4$ may be the same or different and each represent a hydrogen atom, a halogen atom, a hydrocarbon group having from 1 to 20 carbon atoms which may contain a halogen atom, an OR group, an SR group, an OCOR group, an $SO_2R$ group, an $OSO_2R$ group, or an NRR' group, in which R and R' may be the same or different and each represent a hydrogen atom or a hydrocarbon group having from 1 to 7 carbon atoms which may contain a halogen atom; $R^{18}$ and $R^{19}$ may be the same or different and each represent a hydrogen atom, a hydrocarbon group having from 1 to 20 carbon atoms, an OR group, or an SR group, in which R represents a hydrogen atom or a hydrocarbon group having from 1 to 7 carbon atoms which may contain a halogen atom, $R^{18}$ and $R^{19}$ may be connected to each other to form a ring; $R^{24}$ represents a hydrocarbon group having from 1 to 5 carbon atoms which may contain silicon atom; $R^{20}$ to $R^{23}$, $R^{25}$, and $R^{26}$ may be the same or different and each represent a hydrogen atom or a hydrocarbon group having from 1 to 20 carbon atoms which may contain silicon atom, $R^{23}$ and $R^{25}$, and $R^{24}$ and $R^{26}$ may be connected to each other via a carbon atom to form a ring; $Y^2$ represents a carbon atom, a silicon atom, or a germanium atom; and n represents an integer of from 1 to 3,

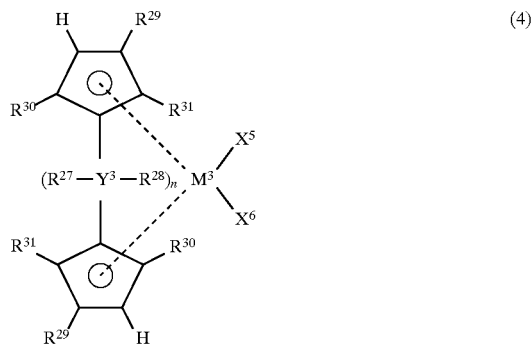
(4)

wherein $M^3$ represents a transition metal atom selected from Ti, Zr, and Hf; $X^5$ and $X^6$ may be the same or different and each represent a hydrogen atom, a halogen atom, a hydrocarbon group having from 1 to 20 carbon atoms which may contain halogen atom, an OR group, an SR group, an OCOR group, an $SO_2R$ group, an $OSO_2R$ group, or an NRR' group, in which R and R' are as defined above; $R^{27}$ and $R^{28}$ may be the same or different and each represent a hydrogen atom, a hydrocarbon group having from 1 to 20 carbon atoms, an OR group, or an SR group, in which R is as defined above; $R^{27}$ and $R^{28}$ may be connected to each other to form a ring; $R^{29}$ represents a hydrocarbon group having from 1 to 5 carbon atoms which may contain a silicon atom; $R^{30}$ and $R^{31}$ may be the same or different and each represent a hydrogen atom or a hydrocarbon group having from 1 to 20 carbon atoms which may contain a silicon atom; $R^{29}$ and $R^{31}$ may be connected to each other via a carbon atom to form a ring; $Y^3$ represents a carbon atom, a silicon atom, or a germanium atom; and n represents an integer of from 1 to 3.

For the details of the various substituents in formulae (3) and (4), reference can be made to formula (1). However, the metallocene compound represented by formula (3) or (4) is a metallocene compound which is known to provide a crystalline polyolefin rather than amorphous atactic polyolefin in the case of polymerization of α-olefin such as propylene, among known metallocene compounds.

Specific examples of the metallocene compound represented by formula (3) include:
iPr[(Cp)(Flu)]ZrCl$_2$,
iPr[3-tBuCp)(3-tBuInd)]ZrCl$_2$, and
Me$_2$Si[(3-tBuCp) (Flu)]ZrCl$_2$.

Specific examples of the metallocene compound represented by formula (4) include:
Et[Ind]$_2$ZrCl$_2$,
Et[THInd]$_2$ZrCl$_2$,
Me$_2$Si[Ind]$_2$ZrCl$_2$,
Me$_2$Si[2-MeInd]$_2$ZrCl$_2$,
Me$_2$Si[2,4-Me$_2$Ind]2ZrCl2,
Me$_2$Si[2,4,7-Me$_3$Ind]$_2$ZrCl$_2$,
Me$_2$Si[2-Me-4,6-iPr$_2$Ind]$_2$ZrCl$_2$,
Me$_2$Si[2-Me-4-iPrInd]$_2$ZrCl$_2$,
Me$_2$Si[2-Me-4-PhInd]$_2$ZrCl$_2$,
Me$_2$Si[2-Me-4-(1-Naph)Ind]$_2$ZrCl$_2$,
Me$_2$Si[2-MeBenzind]$_2$ZrCl$_2$,
Me$_2$Si[3-tBucp]$_2$ZrCl$_2$,
Me$_2$Si[2-Me-4-tBuCp]$_2$ZrCl$_2$,
Me$_2$Si[2,4,5-Me$_3$Cp]$_2$ZrCl$_2$, and
Me$_2$Si[2,4,5-Me$_3$Cp]$_2$HfCl$_2$.

In the foregoing formulae, Me represents a methyl group, iPr represents an isopropyl group, tBu represents a t-butyl group, Ph represents a phenyl group, Naph represents a naphthyl group, Cp represents a cyclopentadienyl group, Ind represents an indenyl group, THInd represents a 4,5,6,7-tetrahydroindenyl group, Benzind represents a 4,5-benzoindenyl group, Flu represents a fluorenyl group, Si[ ] represents a silylene group, iPr[ ] represents an isopropylydene group, Et[ ] represents an ethylidene group, Zr represents a zirconium atom, Hf represents a hafnium atom, and Cl represents a chlorine atom.

The metallocene compounds exemplified above are all known from JP-A-3-314978, JP-A-6-122718, U.S. Pat. No. 5,132,262, Angew. Chem. Int. Ed. Enql., vol. 24, p. 507 (1985), J. Am. Chem. Soc., vol. 110, p. 6255 (1998), Chem. Lett., p. 1853 (1989), Orqanometallics, vol. 13, p. 954 (1994), ibid vol. 13, p. 964 (1994)

In the procedure of synthesis of the metallocene compound represented by formula (1) of the present invention, a metallocene compound (3) or (4) for the polymerization of a crystalline polyolefin, particularly crystalline polypropylene, may be simultaneously synthesized. The two metallocene compounds thus synthesized may be used for polymerization without being isolated. The metallocene catalyst system comprising a metallocene compound represented by formula (1) may be used in combination with other crystalline polyolefin production catalyst which has heretofore been known, e.g., magnesium chloride-supported Ziegler-Natta catalyst, than the foregoing crystalline polyolefin production metallocene catalyst system.

The polyolefin obtained in the present invention can be used as a modifier or compounding agent for various resins.

The polyolefin obtained by the polymerization of ethylene or the copolymerization of ethylene with one or more olefins represented by formula (2) can be blended with other polyolefins to enhance its moldability or the properties of the final product.

The polyolefin obtained by the polymerization or copolymerization of one or more olefins represented by formula (2) exhibits excellent properties if blended with other poly ($\alpha$-olefin). For example, the polyolefin of the present invention can exhibit enhanced elastic properties when blended with, e.g., a crystalline poly($\alpha$-olefin) as crystalline poly($\alpha$-olefin) having a stereoregularity of mm % $\geq$90% or rr % $\geq$80% in an amount of not more than 50% by weight. Further, such a crystalline poly($\alpha$-olefin) can exhibit a drastic enhancement of impact resistance if blended with the polyolefin of the present invention in an amount of not more than 50% by weight. In particular, an isotactic polypropylene resin which requires a high impact resistance when used as an automobile bumper or the like can be blended with the polyolefin of the present invention, particularly polypropylene polymer to advantage. Further, the polyolefin of the present invention obtained by the polymerization or copolymerization of one or more olefins represented by formula (2) is essentially amorphous and thus can be a compounding agent extremely excellent in radiation resistance.

The polyolefin obtained in the present invention can make the best use of its transparency, flexibility, strength, formability, heat-sealability or other properties so that it can be incorporated in various products.

The polyolefin obtained in the present invention can also be used as a modifier or compounding agent for resins other than the foregoing crystalline polyolefin, such as an ethylene-vinyl acetate copolymer, a saponification product thereof, an ethylene-vinyl alcohol copolymer, a halogen-containing copolymer (e.g., polyvinylidene chloride, polyvinyl chloride, polyvinyl fluoride, polyvinylidene fluoride, polypropylene, rubber chloride), an unsaturated carboxylic acid, and a polymer of derivatives thereof (e.g., polymethyl methacrylate, polyalkyl acrylate).

The polyolefin obtained in the present invention can be further used as a starting material of various graft copolymers and block copolymers.

The present invention will be further described in the following examples, but the present invention should not be construed as being limited thereto.

In the examples below, the metallocene compound of the present invention was identified by the following methods.
$^1$H-NMR:
$^1$H-NMR of the metallocene compound was measured in chloroform-d at a temperature of 30° C.
Mass spectrometry:
The specimen was introduced by a direct introduction method, and then ionized by an electron bombardment method (70 eV) for measurement.
The physical properties of the polymer were measured as follows:
$^{13}$C—NMR:
$^{13}$C—NMR of the polymer was measured in a 1:3 mixture (by weight) of benzene-$d_6$ and 1,3,5-trichlorobenzene at a temperature of 120° C. (measurement mode: proton decoupling method; pulse width: 8.0 $\mu$s; pulse repetition time: 3.0 s; integrating time: 20,000; internal standard: hexamethyl disiloxane).

The reactivity ratio $r_1r_2$, which indicates the comonomer composition distribution in the ethylenic copolymer, and the extent of incorporated comonomer in the polymer chain are calculated in accordance with *J. Polm. Sci., Polym. Chem.*, vol. 29, p. 1585 (1991), *Polym. Bull.*, vol. 26, p. 325 (1991).

The stereoregularity of the polypropylene was evaluated by the intensity ratio of mm, mr and rr signals derived from methyl group in accordance with *Macrolecules*, vol. 6, p. 925 (1973), ibid, vol. 8, p. 687 (1975).
Gel permeation chromatography (GPC):
The gel permeation chromatography of the polymer was effected in 1,2,4-trichlorobenzene at a column temperature of 135° C. and a solvent flow rate of 1 ml/min.
Differential scanning calorimetry (DSC):
The polymer was heated to a temperature of 230° C. where it was then kept for 5 minutes. The polymer thus heated was then scanned while being cooled at a rate of 20° C./min. for the measurement of heat of crystallization. The polymer was then kept at a temperature of 25° C. for 5 minutes. The polymer was then scanned while being heated at a rate of 20° C./min. for the measurement of heat of fusion.

The ethylenic polymer was measured for the following properties:
Melt flow rate (MFR):
The melt flow rate of the ethylenic polymer was measured at a temperature of 190° C. under a load of 2.16 kg in accordance with JIS K-6760.
High load melt flow rate (HLMFR):
The high load melt flow rate of the ethylenic polymer was measured at a temperature of 190° C. under a load of 21.6 kg in accordance with JIS K-6760.
Density:
The density of the ethylenic polymer was measured in accordance with JIS K-6750. Specifically, the specimen was pressed at temperatures of 23° C. and 190° C., cut, deaerated in ethanol, and then measured by means of a density gradient tube.
Melt tension (MT):
The polymer specimen to be measured was in the form of powder. The measurement was effected with an orifice inner diameter of 2.095 ±0.005 mm and an orifice length of 8.000±0.025 mm at a resin temperature of 190° C., an extrusion speed of 15 mm/min. and a winding speed of 6.5 m/min.

The propylene polymer was measured for the following properties:
Tensile test:
The tensile test was conducted in accordance with JIS K-6301. Specifically, the propylene polymer was kneaded at a temperature of 230° C. by means of a 3-in. roll for 5 minutes, and then pressed into a 1-mm thick plate to obtain a No. 2 ½ dumbbell specimen. The measurement was conducted at a pulling speed of 200 mm/min.
Elongation set:
A specimen having 20 mm between two gage marks was kept extended by 100% for 1 minute. When 10 minutes passed since the specimen was released, the distance D between the two gage marks was measured. The elongation set was calculated from the following equation:

Elongation set (%)=(D−20)×100/20

Internal haze:
A 0.5-mm thick pressed plate was measured for internal haze in accordance with JIS K7105.

The analyzers used for the measurement of physical properties are as follows:

NMR: EX-400 (available from Nihon Denshi K. K.)

Mass spectrometry: AX-500 (available from Nihon Denshi K. K.)

GPC: Waters 150C (Shodex; GPC AT-806MS column)

DSC: Perkin Elmer DSC7

MT: Melt Tension Tester II (available from Toyo Seiki Seisakujo K. K.)

Among known metallocene compounds, the following compounds were synthesized in accordance with known references.

JP-A-5-345793:
Isopropylidene(1-indenyl)(9-fluorenyl)zirconium dichloride
JP-A-63-235309:
Bis(1,2,4-trimethylcyclopentadienyl)zirconium dichloride
J. Organomet. Chem., vol. 288, p. 63 (1985):
rac-Ethylidenebis(indenyl) zirconium dichloride
U.S. Pat. No. 5,001,205:
rac-Dimethylsilylenebis(tetrahydroindenyl) zirconium dichloride
Organometallics, vol. 13, p. 954 (1994):
rac-Dimethylsilylenebis(2-methyl-4-(1-naphthyl) indenyl)-zirconium dichloride Isopropylidene(3-t-butyl-1-indenyl)(9-fluorenyl)-zirconium dichloride used in Comparative Example 16 was synthesized in the same manner as in Examples 1 and 2. Synthesis of Metallocene Compound:

EXAMPLE 1

Synthesis of Dimethylsilylene(2-methyl-4-(1-naphthyl)Indenyl) (9-Fluorenyl Zirconium Dichloride (IMNFZ)

(1) Dimethyl(2-methyl-7-(1-naphthyl)indenyl) (9-fluorenyl)silane was synthesized.

The reaction was effected in an atmosphere of nitrogen gas. The glass reaction vessel used had been previously dried. 5.0 g (19.5 mmol) of 2-methyl-7-(1-naphthyl)indene (synthesized in accordance with Organometallics, vol. 13, p. 954 (1994)) was dissolved in 100 ml of dried tetrahydrofuran (THF). To the solution was then added 13.0 ml (20.8 mmol) of a 1.6 mol/l hexane solution of n-butyl lithium over ice-water bath. The reaction mixture was then allowed to undergo reaction at room temperature for 3 hours to obtain a light brown solution. A solution of 2.7 g (21 mmol) of dimethyl dichlorosilane in 200 ml of THF was cooled to a temperature of 0° C. To the solution was then added dropwise the light brown solution which had been previously prepared in 2 hours. After the completion of the dropwise addition, the temperature of the mixture was returned to room temperature where it was then stirred for 12 hours. To the solution was then added dropwise a fluorenyl lithium solution which had been similarly prepared from 3.32 g (20 mmol) of fluorene and 13.0 ml of a n-butyl lithium solution while being cooled with ice over 15 minutes. The temperature of the mixture was returned to room temperature where it was then stirred for 12 hours. The reaction solution was stirred with an aqueous solution of ammonium chloride, extracted with 500 ml of diethyl ether, and then dried over anhydrous sodium sulfate. The material was then subjected to column chromatography (silica gel; developing solvent: n-hexane) to separate the reaction product from the starting materials. As a result, 5.6 g (11.7 mmol; yield: 59%) of the desired compound was obtained.

The elementary analysis of the compound thus obtained is given below.

Elementary analysis: Calculated (%) for $C_{35}H_{30}Si$: C87.82, H6.32; Found (%): C87.95, H6.55

(2) The subsequent reaction of synthesis to zirconium complex was effected in an atmosphere of argon gas. 6.5 g (13.6 mmol) of dimethyl(2-methyl-7-(1-naphthyl)indenyl)-(9-fluorenyl)silane thus obtained was dissolved in 100 ml of dried THF. To the solution was then added 18.7 ml (28.7 mmol) of a 1.65 mol/l hexane solution of n-butyl lithium while being cooled with ice. The reaction mixture was then allowed to undergo reaction at room temperature for 2 hours. THF was then distilled off under reduced pressure. To the solution was then added 50 ml of dried toluene while being cooled to a temperature of −78° C. to obtain a greenish brown suspension. 3.2 g (13.6 mmol) of zirconium tetrachloride was suspended in 100 ml of dried toluene in a flask. The suspension was then cooled to a −78° C. Under these conditions, the greenish brown toluene solution which had been previously prepared was then added to the suspension through a cannula while being cooled to the same temperature. The reaction mixture was then stirred at a temperature of −78° C. for 1 hour. The temperature of the mixture was returned to room temperature where it was then allowed to undergo reaction for 10 hours to obtain a red suspension. The suspension was then subjected to centrifugal separation to remove the toluene solution and separate a red solid therefrom. The red solid thus obtained was then extracted with 600 ml of dried methylene chloride by means of a Soxhlet extractor. The resulting red transparent solution was then concentrated to precipitate a red crystal.

Mass spectrometry: EI (70 eV), direct introduction method, 638 (M$^+$); $^1$H-NMR (400 MHz, CDCl$_3$): δ1.43 (3H, Si—CH$_3$), 1.60 (3H, Si—CH$_3$), 2.17 (3H, Ind—CH$_3$), 6.25 (1H, Ind—H), 6.9–8.4 (18H, Aryl-H)

Elementary analysis: Calculated (%) for $C_{35}H_{28}SiZrCl_2$: C65.81, H4.42; Found (%): C64.20, H3.91

EXAMPLE 2

Synthesis of Dimethylsilylene(2-methyl-4-phenylindenyl) (9-fluorenyl)Zirconium Dichloride (IMPFZ)

(1) Dimethyl(2-methyl-7-phenylindenyl) (9-fluorenyl) silane was synthesized.

The procedure of Example 1 was followed. In some detail, 6.3 g (30.5 mmol) of 2-methyl-7-phenylindene (synthesized in accordance with Organometallics, vol. 13, p. 954 (1994)) was dissolved in 100 ml of dried tetrahydrofuran (THF). To the solution was then added 21.0 ml (33.6 mmol) of a 1.6 mol/l hexane solution of n-butyl lithium over ice-water bath. The reaction mixture was then allowed to undergo reaction at room temperature for 3 hours. The solution was then added dropwise to a solution of 4.4 g (34 mmol) of dimethyl dichlorosilane in 200 ml of THF over ice-water bath over 2 hours. After the completion of the dropwise addition, the temperature of the mixture was returned to room temperature where it was then stirred for 12 hours. To the solution was then added dropwise a fluorenyl lithium solution which had been similarly prepared from 5.1 g (30.5 mmol) of fluorene and 21.0 ml of a n-butyl lithium solution while being cooled with ice in 15 minutes. The temperature of the mixture was returned to room temperature where it was then stirred for 12 hours. The reaction solution was stirred with an aqueous solution of ammonium chloride, extracted with diethyl ether, and then dried over anhydrous sodium sulfate. The material was then subjected to column chromatography (silica gel; developing solvent: n-hexane) to separate the reaction product from the starting materials. As a result, 8.5 g (19.8 mmol; yield: 65%) of the desired compound was obtained.

The elementary analysis of the compound thus obtained is given below.

Elementary analysis: Calculated (%) for $C_{31}H_{28}Si$: C86.92, H6.54; Found (%): C86.95, H6.75

(2) The subsequent reaction of synthesis to zirconium complex was effected in the same manner as in Example 1. In some detail, 6.8 g (15.9 mmol) of dimethyl(2-methyl-7-phenylindenyl)(9-fluorenyl)silane thus obtained was dissolved in 100 ml of dried THF. To the solution was then added 21.8 ml (35.0 mmol) of a 1.65 mol/l hexane solution of n-butyl lithium while being cooled with ice. The reaction mixture was then allowed to undergo reaction at room temperature for 2 hours. THF was then distilled off under reduced pressure. To the solution was then added 50 ml of dried toluene while being cooled to a temperature of −78° C. to obtain a greenish brown suspension. On the other hand, 3.7 g (15.9 mmol) of zirconium tetrachloride was suspended in 100 ml of dried toluene in a flask. The suspension was then cooled to a −78° C. Under these conditions, the greenish brown toluene solution which had been previously prepared was then added to the suspension through a cannula while being cooled to the same temperature. The reaction mixture was then stirred at a temperature of −78° C. for 1 hour. The temperature of the mixture was returned to room temperature where it was then allowed to undergo reaction for 10 hours to obtain a red suspension. The suspension was then subjected to centrifugal separation to remove the toluene solution and separate a red solid therefrom. The red solid thus obtained was then extracted with dried methylene chloride by means of a Soxhlet extractor. A red crystal was then obtained from the resulting red transparent solution.

Mass spectrometry: EI (70 eV), direct introduction method, 588 (M$^+$); $^1$H-NMR (400 MHz, CDCl$_3$): δ1.43 (3H, Si—CH$_3$), 1.60 (3H, Si—CH$_3$), 2.21 (3H, Ind—CH$_3$), 6.40 (1H, Ind—H), 6.9–8.4 (18H, Aryl-H)

Elementary analysis:

Calculated (%) for $C_{31}H_{26}SiZrCl_2$: C63.27, H4.42; Found (%): C63.20, H4.20

Preparation of Ethylenic Polymer:

EXAMPLE 3

Supporting of methylaluminoxane on carrier

Into a 100-ml flask the air in which had been thoroughly replaced by nitrogen were charged 25 ml of toluene and 1.5 g of silica (obtained by calcining Davison 952 at a temperature of 300° C. for 4 hours). To the suspension thus obtained was then added 37 ml of methylaluminoxane (1.35 mol/l (in aluminum atom equivalence) toluene solution, available from Toso Aczo Co., Ltd.). The reaction mixture was then stirred at room temperature for 30 minutes. The solvent was then distilled off under reduced pressure. To the reside was then added 50 ml of heptane. The reaction mixture was then stirred at a temperature of 80° C. for 4 hours. The reaction solution was then washed with heptane twice at a temperature of 80° C. to obtain a solid component. The solid component comprised methylaluminoxe in an amount of 33% by weight.

Polymerization

Into a 1.5-l internal volume SUS autoclave the air in which had been thoroughly replaced by nitrogen were introduced 3.2 ml of a 0.5 mol/l hexane solution of tri-i-butyl aluminum, 105 mg of the foregoing silica-supported methylaluminoxane, a solution of 2.02 mg of dimethylsilylene(2-methyl-4-(1-naphthyl) indenyl)-(9-fluorenyl)zirconium dichloride (IMNFZ) synthesized in Example 1 in 6 ml of toluene, and 800 ml of isobutane. The reaction mixture was then heated to a temperature of 70° C. Into the reaction system was then introduced ethylene to initiate polymerization. The polymerization was effected at an ethylene pressure of 10 kg/cm$^2$ and a temperature of 70° C. for 30 minutes to obtain 69.3 g of a polymer. The polymer exhibited an activity of 6.9 kg-polymer/g-complex·hr·atm.

The physical properties of the polymer thus obtained were as follows:

Mw=990,000; Mw/Mn=4.25

The polymer exhibited a density of 0.948 g/cm$^3$ and a melting point of 132° C. The melt tension of the polymer was immeasurable.

EXAMPLE 4

Into a 1.5-l internal volume SUS autoclave the air in which had been thoroughly replaced by nitrogen were introduced 3.2 ml of a 0.5 mol/l hexane solution of triisobutyl aluminum, 105 mg of the silica-supported methylaluminoxane prepared in Example 3, a solution of 2.02 mg of dimethylsilylene(2-methyl-4-(1-naphthyl) indenyl)-(9-fluorenyl)zirconium dichloride (IMNFZ) synthesized in Example 1 in 6 ml of toluene, and 800 ml of isobutane. The reaction mixture was then heated to a temperature of 70° C. Into the reaction system was then introduced a mixture ($H_2/C_2$ (by weight)=4×10$^{-5}$) of ethylene and hydrogen to initiate polymerization. The polymerization was effected at a mixture gas pressure of 10 kg/cm$^2$ and a temperature of 70° C. for 30 minutes to obtain 37.6 g of a polymer. The polymer exhibited an activity of 3.7 kg-polymer/g-complex·hr·atm.

The physical properties of the polymer thus obtained were as follows:

HLMFR=0.11; Mw=407,000; Mw/Mn=3.94

The polymer exhibited a density of 0.957 g/cm$^3$ and a melting point of 132° C. The melt tension of the polymer was immeasurable.

EXAMPLES 5 TO 7

Polymerization was effected in the same manner as in Example 4 except that the mixing gas ratio was altered. The polymerization conditions and results are set forth in Table 1. The physical properties of the polymer thus obtained are set forth in Table 2.

EXAMPLES 8 TO 10

Polymerization was effected in the same manner as in Examples 3 to 7 except that dimethylsilylene(2-methyl-4-phenylindenyl) (9-fluorenyl)zirconium dichloride (IMPFZ) produced in Example 2 was used as a metallocene compound. The polymerization conditions and results are set forth in Table 1. The physical properties of the polymer thus obtained are set forth in Table 2.

COMPARATIVE EXAMPLE 1

Polymerization was effected in the same manner as in Example 3 except that isopropylidene(indenyl)(fluorenyl)-zirconium dichloride (a) was used as a metallocene compound. The polymerization conditions and results are set forth in Table 1. The physical properties of the polymer thus obtained are set forth in Table 2.

COMPARATIVE EXAMPLES 2 AND 3

Polymerization was effected in the same manner as in Examples 3 and 4 except that bis(n-butylcyclopentadienyl)

-zirconium dichloride (b) was used as a metallocene compound. The polymerization conditions and results are set forth in Table 1. The physical properties of the polymer thus obtained are set forth in Table 2.

COMPARATIVE EXAMPLES 4 AND 5

Polymerization was effected in the same manner as in Examples 3 and 4 except that bis(1-methyl-3-n-butylcyclopentadienyl) zirconium dichloride (c) was used as a metallocene compound. The polymerization conditions and results are set forth in Table 1. The physical properties of the polymer thus obtained are set forth in Table 2.

COMPARATIVE EXAMPLE 6

Polymerization was effected in the same manner as in Example 4 except that bis(1,2,4-trimethylcyclopentadienyl)-zirconium dichloride (d) was used as a metallocene compound. The polymerization conditions and results are set forth in Table 1. The physical properties of the polymer thus obtained are set forth in Table 2.

COMPARATIVE EXAMPLES 7 AND 8

Polymerization was effected in the same manner as in Examples 3 to 5 except that ethylidenebis(indenyl) zirconium dichloride (e) was used as a metallocene compound. The polymerization conditions and results are set forth in Table 1. The physical properties of the polymer thus obtained are set forth in Table 2.

The relationship between MT and MFR was determined from these results as shown in FIG. 1.

The comparison of the foregoing examples with the comparative examples shows that the metallocene compound of the present invention can form a catalyst enabling the production of a polyethylene having a high melt tension. In particular, the comparison of the examples with Comparative Example 1 shows that among crosslinked metallocene compound groups having indene ring and fluorene ring, the group having substituents of the present invention can form a catalyst enabling the production of a polyethylene having a specifically high melt tension.

Further, the comparison of the examples with Comparative Examples 7 and 8 shows that the metallocene compound of the present invention enables the production of a polyethylene having a higher molecular weight than the metallocene compounds which have heretofore been known to form catalysts enabling the production of a polyethylene having a high melt tension even if hydrogen is introduced into the polymerization system during the polymerization.

TABLE 1

| | Metallocene | Weight (mg) | MAO/SiO$_2$ (mg) | TIBA (ml) | Ethylene pressure (Kg/cm$^2$) | Hydrogen ratio (10$^{-5}$ wt %) | Yield (g) | Activity (Kg-PE/g-Zr · h · atm) |
|---|---|---|---|---|---|---|---|---|
| Example 3 | IMNFZ | 2.02 | 105 | 3.2 | 10 | 0.0 | 49 | 4.9 |
| Example 4 | IMNFZ | 2.02 | 105 | 3.2 | 10 | 4.2 | 38 | 3.7 |
| Example 5 | IMNFZ | 2.02 | 105 | 3.2 | 10 | 8.2 | 28 | 2.8 |
| Example 6 | IMNFZ | 2.02 | 105 | 3.2 | 10 | 17.3 | 21 | 2.0 |
| Example 7 | IMNFZ | 2.02 | 105 | 3.2 | 10 | 25.5 | 15 | 1.4 |
| Example 8 | IMPFZ | 2.71 | 151 | 4.6 | 10 | 0.0 | 86 | 8.4 |
| Example 9 | IMPFZ | 2.82 | 158 | 4.8 | 10 | 17.3 | 59 | 4.2 |
| Example 10 | IMPFZ | 3.19 | 179 | 5.4 | 10 | 23.0 | 63 | 4.0 |
| Comparative Example 1 | a | 2.73 | 187 | 5.7 | 10 | 0.0 | 21 | 1.6 |
| Comparative Example 2 | b | 2.42 | 197 | 6.0 | 10 | 0.0 | 105 | 8.7 |
| Comparative Example 3 | b | 2.29 | 187 | 5.7 | 10 | 4.2 | 75 | 6.5 |
| Comparative Example 4 | c | 2.19 | 167 | 5.1 | 10 | 0.0 | 105 | 10.9 |
| Comparative Example 5 | c | 2.10 | 158 | 4.8 | 10 | 4.2 | 87 | 8.3 |
| Comparative Example 6 | d | 3.31 | 289 | 8.8 | 10 | 4.2 | 22 | 1.3 |
| Comparative Example 7 | e | 3.12 | 246 | 7.5 | 10 | 0.0 | 57 | 3.7 |
| Comparative Example 8 | e | 3.12 | 246 | 7.5 | 10 | 7.1 | 41 | 2.6 |

TABLE 2

| | MFR (g/10 min) | HLMFR (g/10 min) | Mw (×10$^{-3}$) | Mw/Mn | Density (g/cm$^3$) | Tm (°C.) | Melt tension (g) |
|---|---|---|---|---|---|---|---|
| Example 3 | — | — | 990 | 4.61 | 0.948 | 132 | — |
| Example 4 | — | 0.11 | 407 | 3.94 | 0.957 | 132 | — |
| Example 5 | 0.01 | 1.21 | 279 | 4.61 | 0.939 | 132 | — |
| Example 6 | 0.08 | 2.85 | 211 | 4.25 | 0.950 | 133 | 31.0 |
| Example 7 | 1.83 | 61.5 | 95 | 3.37 | 0.945 | 133 | 10.5 |
| Example 8 | — | — | 870 | 3.75 | 0.951 | 133 | — |
| Example 9 | 0.07 | 2.73 | 225 | 3.91 | 0.953 | 133 | 32.3 |
| Example 10 | 1.95 | 60.5 | 90 | 3.85 | 0.949 | 133 | 10.0 |
| Comparative Example 1 | 0.08 | 3.05 | 180 | 2.64 | 0.950 | 134 | 5.1 |

TABLE 2-continued

|  | MFR (g/10 min) | HLMFR (g/10 min) | Mw (×10⁻³) | Mw/Mn | Density (g/cm³) | Tm (°C.) | Melt tension (g) |
|---|---|---|---|---|---|---|---|
| Comparative Example 2 | 0.09 | 3.15 | 175 | 2.29 | 0.939 | 131 | 4.5 |
| Comparative Example 3 | 4.78 | 90.6 | 72 | 2.23 | 0.930 | 132 | 0.1 |
| Comparative Example 4 | 0.07 | 2.79 | 195 | 2.73 | 0.939 | 131 | 4.7 |
| Comparative Example 5 | 2.17 | 73 | 85 | 2.55 | 0.943 | 132 | 0.6 |
| Comparative Example 6 | 0.32 | 11.3 | 157 | 2.43 | 0.935 | 131 | 3.0 |
| Comparative Example 7 | 0.06 | 2.98 | 170 | 3.57 | 0.951 | 134 | 26.8 |
| Comparative Example 8 | 2.02 | 60.1 | 80 | 3.59 | 0.946 | 132 | 8.3 |

Preparation of Ethylenic Copolymer:

EXAMPLE 11

Into a 1.5-l internal volume SUS autoclave the air in which had been thoroughly replaced by nitrogen were introduced 1.1 ml of a 0.5 mol/l hexane solution of tri-i-butyl aluminum, 36 mg of the foregoing silica-supported methylaluminoxane, a solution of 0.69 mg of dimethylsilylene(2-methyl-4-(1-naphthyl)indenyl)(9-fluorenyl) zirconium dichloride (IMNFZ) synthesized in Example 1 in 6 ml of toluene, and 800 ml of 1-hexene. The reaction mixture was then heated to a temperature of 70° C. Into the reaction system was then introduced ethylene to initiate polymerization. The polymerization was effected at an ethylene pressure of 10 kg/cm² and a temperature of 70° C. for 30 minutes to obtain 173 g of a polymer. The polymer exhibited an activity of 49.4 kg-polymer/g-complex·hr·atm.

The physical properties of the polymer thus obtained were as follows:

Mw=705,000; Mw/Mn=4.16;

The polymer exhibited a density of 0.88 g/cm³. In DSC, no peaks of enthalpy due to fusion and crystallization were detected.

The measurement of $^{13}$C—NMR shows that the hexene content in the polymer chain is 35.2% by weight and $r_1r_2$ is 0.49.

EXAMPLE 12

Into a 1.5-l internal volume SUS autoclave the air in which had been thoroughly replaced by nitrogen were introduced 3.2 ml of a 0.5 mol/l hexane solution of triisobutyl aluminum, 105 mg of the silica-supported methylaluminoxane prepared in Example 3, a solution of 0.69 mg of dimethylsilylene(2-methyl-4-(1-naphthyl)indenyl)-(9-fluorenyl) zirconium dichloride (IMNFZ) synthesized in Example 1 in 6 ml of toluene, 90 g of 1-hexene, and 800 ml of isobutane. The reaction mixture was then heated to a temperature of 70° C. Into the reaction system was then introduced a mixture ($H_2/C_2$ (by weight): 5.2×10⁻⁵) of ethylene and hydrogen to initiate polymerization. The polymerization was effected at a mixture gas pressure of 10 kg/cm² and a temperature of 70° C. for 30 minutes to obtain 191 g of a polymer. The polymer exhibited an activity of 18.2 kg-polymer/g-complex·hr·atm.

The physical properties of the polymer thus obtained were as follows:

HLMFR=1.85; Mw=251,000; Mw/Mn=4.20

The polymer exhibited a density of 0.88 g/cm³. In DSC, no peaks of enthalpy due to fusion and crystallization were detected.

The measurement of $^{13}$C—NMR shows that the hexene content in the polymer chain is 35.7% by weight and $r_1r_2$ is 0.51

EXAMPLE 13

Polymerization was effected in the same manner as in Example 12 except that the mixing gas ratio was altered. The polymerization conditions and results are set forth in Table 3. The physical properties of the polymer thus obtained are set forth in Table 4.

EXAMPLES 14 AND 15

Polymerization was effected in the same manner as in Example 12 except that the amount of 1-hexene to be used was altered. The polymerization conditions and results are set forth in Table 3. The physical properties of the polymer thus obtained are set forth in Table 4.

EXAMPLES 16 AND 17

Polymerization was effected in the same manner as in Examples 11 and 15 except that IMPFZ was used as a metallocene compound. The polymerization conditions and results are set forth in Table 3. The physical properties of the polymer thus obtained are set forth in Table 4.

COMPARATIVE EXAMPLE 9

Polymerization was effected in the same manner as in Example 11 except that isopropyridene(indenyl)(fluorenyl)-zirconium dichloride (a) was used as a metallocene compound. The polymerization conditions and results are set forth in Table 3. The physical properties of the polymer thus obtained are set forth in Table 4.

COMPARATIVE EXAMPLES 10 AND 11

Polymerization was effected in the same manner as in Examples 11 and 12 except that bis(n-butylcyclopentadienyl)-zirconium dichloride (b) was used as a metallocene compound. The polymerization conditions and results are set forth in Table 3. The physical properties of the polymer thus obtained are set forth in Table 4.

COMPARATIVE EXAMPLES 12 AND 13

Polymerization was effected in the same manner as in Examples 11 and 12 except that ethylidenebis(indenyl)- zirconium dichloride (e) was used as a metallocene compound. The polymerization conditions and results are set forth in Table 3. The physical properties of the polymer thus obtained are set forth in Table 4.

COMPARATIVE EXAMPLE 14

Polymerization was effected in the same manner as in Example 11 except that dimethylsilylenebis(tetrahydroindenyl)-zirconium dichloride (f) was used as a metallocene compound. The polymerization conditions and results are set forth in Table 3. The physical properties of the polymer thus obtained are set forth in Table 4.

The foregoing examples demonstrate that in the production of an ethylenic copolymer the metallocene compound of the present invention can provide a copolymer having a higher molecular weight while maintaining the uniformity in the comonomer distribution. It can also be seen that the catalyst system of the present invention can provide a higher comonomer conversion (ratio of comonomer incorporated in the polymer chain by the polymerization reaction to comonomer charged) than the conventional metallocene catalyst systems.

TABLE 3

| | Metallocene | Weight (mg) | MAO/SiO$_2$ (mg) | TIBA (ml) | Ethylene pressure (Kg/cm$^2$) | Hydrogen ratio ($10^{-5}$ wt %) | 1-Hexene (g) | Yield (g) | Activity (Kg-PE/g-Zr · h · atm) |
|---|---|---|---|---|---|---|---|---|---|
| Example 11 | IMNFZ | 0.69 | 36 | 1.1 | 10 | 0 | 90 | 173 | 49.4 |
| Example 12 | IMNFZ | 2.06 | 105 | 3.2 | 10 | 5.2 | 90 | 191 | 18.2 |
| Example 13 | IMNFZ | 3.10 | 160 | 4.9 | 10 | 17.3 | 90 | 189 | 12.2 |
| Example 14 | IMNFZ | 3.13 | 160 | 4.9 | 10 | 17.3 | 24 | 120 | 7.7 |
| Example 15 | IMNFZ | 3.13 | 160 | 4.9 | 10 | 17.3 | 15 | 95 | 6.1 |
| Example 16 | IMPFZ | 2.66 | 148 | 4.5 | 10 | 0 | 90 | 215 | 15.9 |
| Example 17 | IMPFZ | 3.21 | 180 | 5.5 | 10 | 17.3 | 10 | 113 | 7.1 |
| Comparative Example 9 | a | 2.44 | 167 | 5.1 | 10 | 0 | 90 | 58 | 4.8 |
| Comparative Example 10 | b | 1.18 | 95 | 2.9 | 10 | 0 | 90 | 108 | 18.8 |
| Comparative Example 11 | b | 0.83 | 69 | 2.1 | 10 | 5.2 | 90 | 53 | 14.1 |
| Comparative Example 12 | e | 2.52 | 197 | 6.0 | 10 | 0 | 90 | 37 | 3.0 |
| Comparative Example 13 | e | 2.73 | 213 | 6.5 | 10 | 5.2 | 90 | 31 | 2.3 |
| Comparative Example 14 | f | 3.12 | 223 | 6.8 | 10 | 0 | 90 | 23 | 1.5 |

TABLE 4

| | MFR (g/10 min) | HLMFR (g/10 min) | Mw (×10$^{-3}$) | Mw/Mn | Density (g/cm$^3$) | Tm (°C.) | Hexene Content (%) | r1r2 |
|---|---|---|---|---|---|---|---|---|
| Example 11 | — | — | 705 | 4.16 | <0.88 | — | 35.2 | 0.44 |
| Example 12 | — | 1.85 | 251 | 4.20 | <0.88 | — | 35.7 | 0.51 |
| Example 13 | 0.95 | 47.3 | 92 | 4.23 | <0.88 | — | 32.4 | 0.49 |
| Example 14 | 1.52 | 38.2 | 99 | 4.53 | 0.907 | 104 | 10.3 | 0.45 |
| Example 15 | 0.99 | 31.5 | 103 | 4.47 | 0.921 | 115 | 7.8 | 0.49 |
| Example 16 | — | — | 790 | 4.24 | <0.88 | — | 31.7 | 0.41 |
| Example 17 | 0.70 | 18.7 | 115 | 4.21 | 0.915 | 110 | 8.7 | 0.39 |
| Comparative Example 9 | 4.80 | 91 | 72 | 2.23 | 0.920 | 113 | 7.6 | 0.70 |
| Comparative Example 10 | 1.81 | 16 | 103 | 2.43 | 0.921 | 110 | 8.6 | 0.55 |
| Comparative Example 11 | 3.54 | — | 72 | 2.73 | 0.925 | 111 | 8.3 | 0.61 |

TABLE 4-continued

|  | MFR (g/10 min) | HLMFR (g/10 min) | Mw (×10$^{-3}$) | Mw/Mn | Density (g/cm$^3$) | Tm (°C.) | Hexene Content (%) | r1r2 |
|---|---|---|---|---|---|---|---|---|
| Comparative Example 12 | 1.03 | 122 | 113 | 3.57 | 0.905 | 103 | 12.5 | 0.73 |
| Comparative Example 13 | 3.32 | — | 81 | 3.32 | 0.915 | 105 | 9.7 | 0.71 |
| Comparative Example 14 | 0.06 | 2.1 | 210 | 3.19 | 0.913 | 104 | 12.8 | 0.75 |

Preparation of Polypropylene Elastomer:

EXAMPLE 18

Into a 1.5-l internal volume SUS autoclave the air in which had been thoroughly replaced by nitrogen was charged 11.7 ml of a 0.5 M toluene solution of tri-i-butyl aluminum (TIBA). 8 mol of liquid propylene was then charged into the autoclave. The reaction mixture was then kept at a temperature of 30° C. To a toluene solution of 2.5 mg (0.039 mmol) of dimethylsilylene(2-methyl-4-(1-naphtyl) indenyl) (9-fluorenyl) zirconium dichloride (IMNFZ) synthesized in Example 1 was added 3.9 ml of a 0.5M toluene solution of TIBA. The reaction mixture was then allowed to undergo reaction at a temperature of 30° C. for 5 minutes (Catalyst A). Further, 2.0 ml of a 2.9 mM toluene solution of [Ph$_3$C][B(C$_6$F$_5$)$_4$] (TPFPB) was prepared (Catalyst B). Catalysts A and B were mixed, and then immediately charged into the reaction vessel where polymerization was then effected at a temperature of 50° C. for 1 hour. After the completion of the reaction, the resulting polypropylene was dried in vacuo.

As a result, 240 g of a transparent amorphous polypropylene elastomer was obtained. It exhibited an activity of 35 kg-PP/g-zr·h per metallocene.

Figure 2:
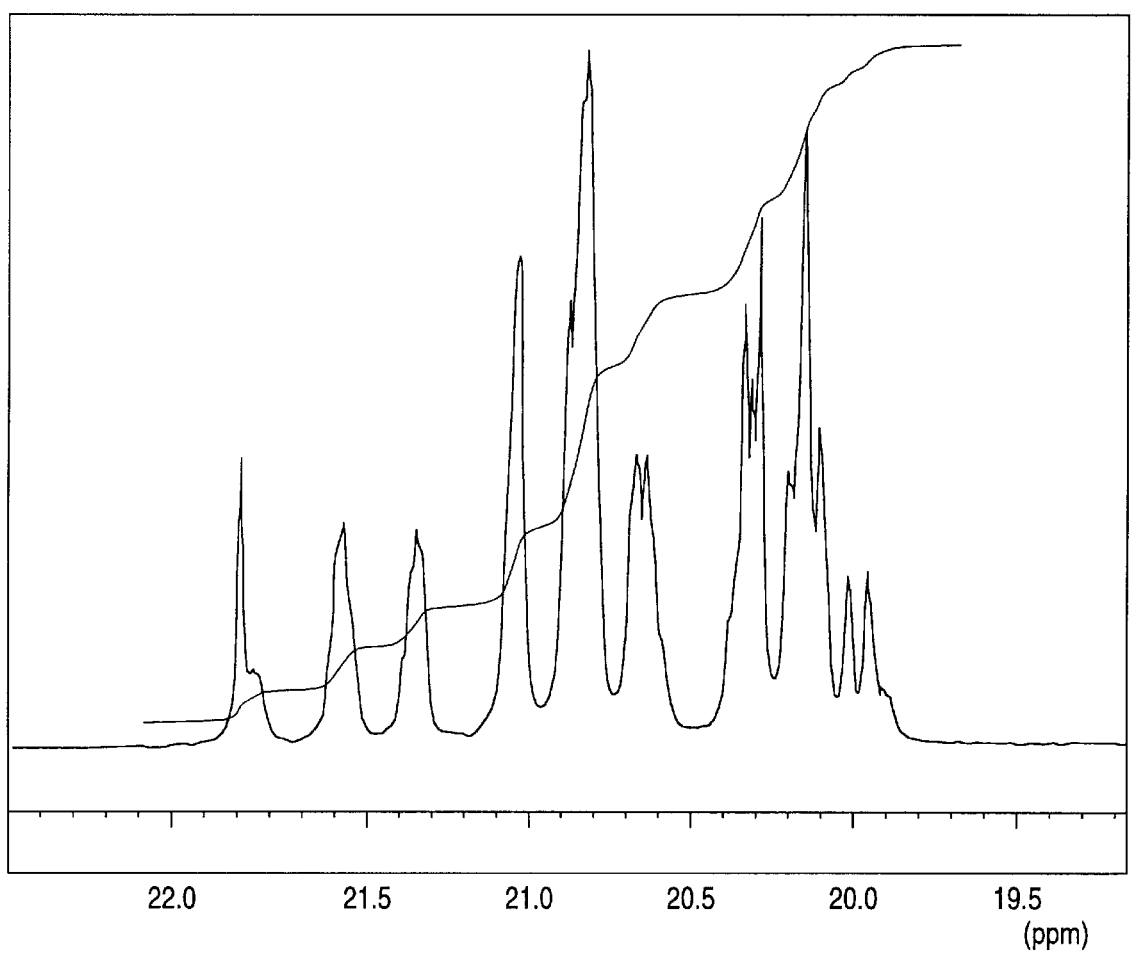
FIG. 2 shows the $^{13}C$—NMR spectrum in the methyl region of the polypropylene produced under the conditions of Example 18.

The stereoregularity of the polymer thus obtained comprised mm=17%, mr=47% and rr=36% ($^{13}$C—NMR spectrum in methyl region is set forth in FIG. 2).

The polymer exhibited a molecular weight Mw of 593,000 and a molecular weight distribution Mw/Mn of 2.8.

In DSC, no peaks of enthalpy due to fusion and crystallization were detected.

EXAMPLE 19

The procedure of Example 18 was followed except that the polymerization temperature was altered to 20° C. and 1.1 mg (0.0017 mmol) of dimethylsilylene(2-methyl-4-(1-naphtyl)-indenyl) (9-fluorenyl)zirconium dichloride (IMNFZ) synthesized in Example 1 was used. As a result, 54 g of a transparent amorphous polypropylene elastomer was obtained. The polymer thus obtained exhibited an activity of 32 kg-PP/g-Zr·h per metallocene.
mm=17%; mr=45%, rr=38%; Mw=853,000, Mw/Mn=2.8

EXAMPLE 20

The procedure of Example 18 was followed except that 1.2 mg (0.0020 mmol) of dimethylsilylene(2-methyl-4-(1-phenylindenyl)(9-fluorenyl)zirconium dichloride (IMPFZ) synthesized in Example 2 was used as a metallocene compound. As a result, 125 g of a transparent amorphous polypropylene elastomer was obtained. The polymer thus obtained exhibited an activity of 61 kg-PP/g-Zr·h per metallocene.
mm=16%; mr=46%, rr=38%; Mw=493,000, Mw/Mn=2.5

EXAMPLE 21

The procedure of Example 18 was followed except that the polymerization temperature was altered to 20° C. and 0.8 mg (0.0014 mmol) of dimethylsilylene(2-methyl-4-phenylindenyl)-(9-fluorenyl) zirconium dichloride (IMPFZ) synthesized in Example 2 was used. As a result, 38 g of a transparent amorphous polypropylene elastomer was obtained. The polymer thus obtained exhibited an activity of 28 kg-PP/g-Zr·h per metallocene.
mm=16%; mr=44%, rr=40%; Mw=793,000, Mw/Mn=2.5

None of the polymers obtained in Examples 17 to 19 showed peaks of enthalpy due to fusion and crystallization.

COMPARATIVE EXAMPLE 15

The procedure of Example 18 was followed except that 0.77 mg (0.0016 mmol) of isopropyridene(1-indenyl)-(9-fluorenyl) zirconium dichloride (a) was used.

As a result, 17 g of an oily atactic polypropylene was obtained. The polymer thus obtained exhibited activity of 22 kg-PP/g-Zr·h per metallocene compound.
mm=27%; mr=33%; rr=40%; Mw=5,200; Mw/Mn=2.8

COMPARATIVE EXAMPLE 16

The procedure of Example 18 was followed except that 0.92 mg (0.0017 mmol) of isopropyridene(3-t-butyl-1-indenyl)-(9-fluorenyl) zirconium dichloride (g) was used.

As a result, 19 g of a powdered isotactic polypropylene was obtained. The polymer thus obtained exhibited activity of 21 kg-PP/g-Zr·h per metallocene compound.
mm=78%; mr=12%; rr=10%; Mw=214,000; Mw/Mn=2.6

The foregoing examples demonstrate that among the crosslinked metallocene compound groups having indene ring and fluorene ring, the group having substituents of the present invention can form a catalyst which specifically enables the production of a polypropylene elastomer.

EXAMPLE 22

Figure 3:
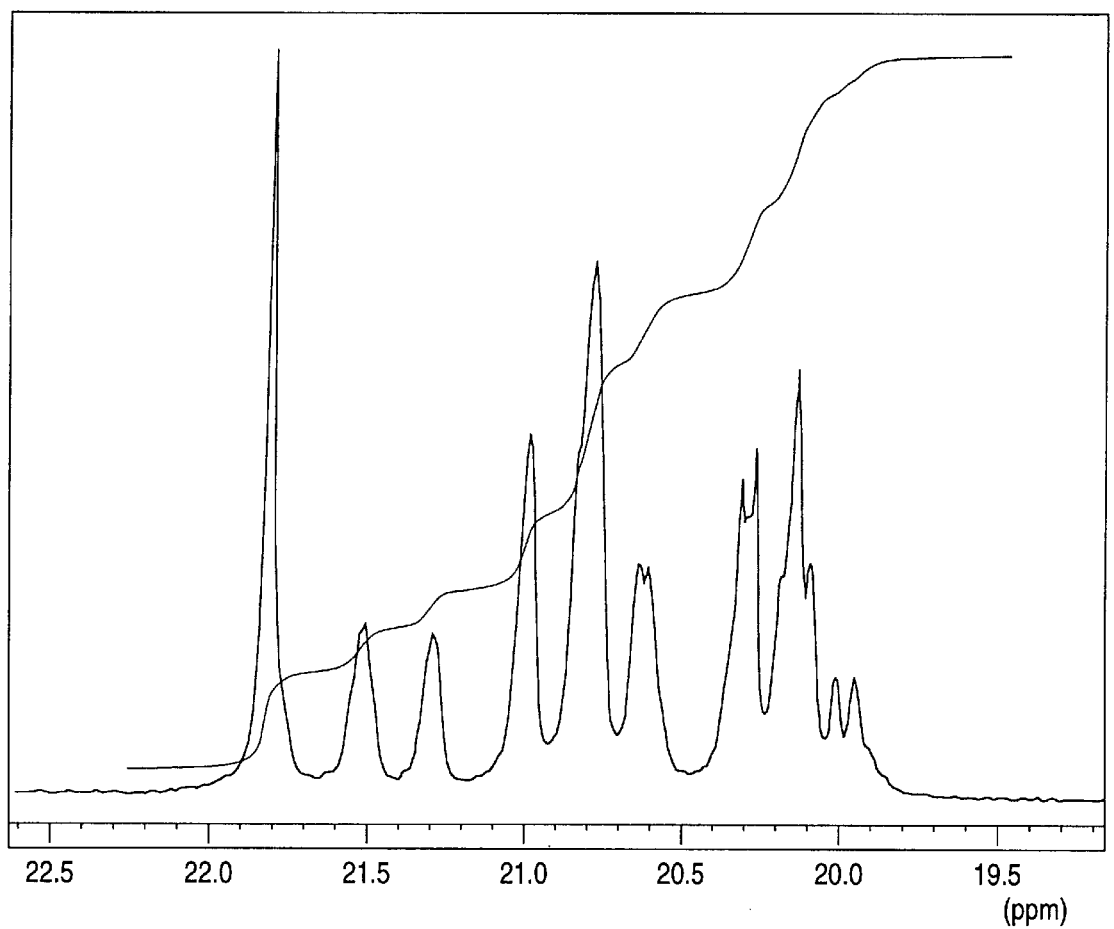
FIG. 3 shows the $^{13}C$—NMR spectrum in the methyl region of the polypropylene produced under the conditions of Example 22.

1.8 g (2.8 mmol) of dimethylsilylene(2-methyl-4-(1-naphthyl)indenyl) (9-fluorenyl)zirconium dichloride (IMNFZ) and 10 mg (0.014 mmol) of rac-dimethylsilylene-(2-methyl-4-(1-naphthyl)indenyl) zirconium dichloride (h) were dissolved in 100 ml of toluene (distilled and dried in the presence of Na-K alloy). 0.10 ml of the toluene solution thus obtained was then subjected to propylene polymerization at a temperature of 60° C. in the same manner as in Example 18. As a result, 72 g of a transparent polypropylene elastomer was obtained. The polymer thus obtained exhibited an activity of 40 kg-PP/g-Zr·h per metallocene compound.
mm=25%; mr=42%; rr=33% ($^{13}$C—NMR spectrum in methyl region is set forth in FIG. 3)

Mw=428,000; Mw/Mn=5.2

In DSC, the polymer showed a melting point at 146.4° C.

EXAMPLE 23

The procedure of Example 22 was followed except that 0.13 ml (0.0035 mmol per mol of metallocene compound used) of a toluene solution of metallocene compound was used and the polymerization temperature was altered to 70° C. As a result, 78 g of a transparent polypropylene elastomer was obtained. The polymer thus obtained exhibited an activity of 35 kg-PP/g-Zr·h per metallocene compound. mm=28%; mr=41%; rr=31%; Mw=320,000; Mw/Mn=8.9

In DSC, the polymer showed a melting point at 146.2° C. The results are set forth in Tables 5 and 6.

Figure 4:
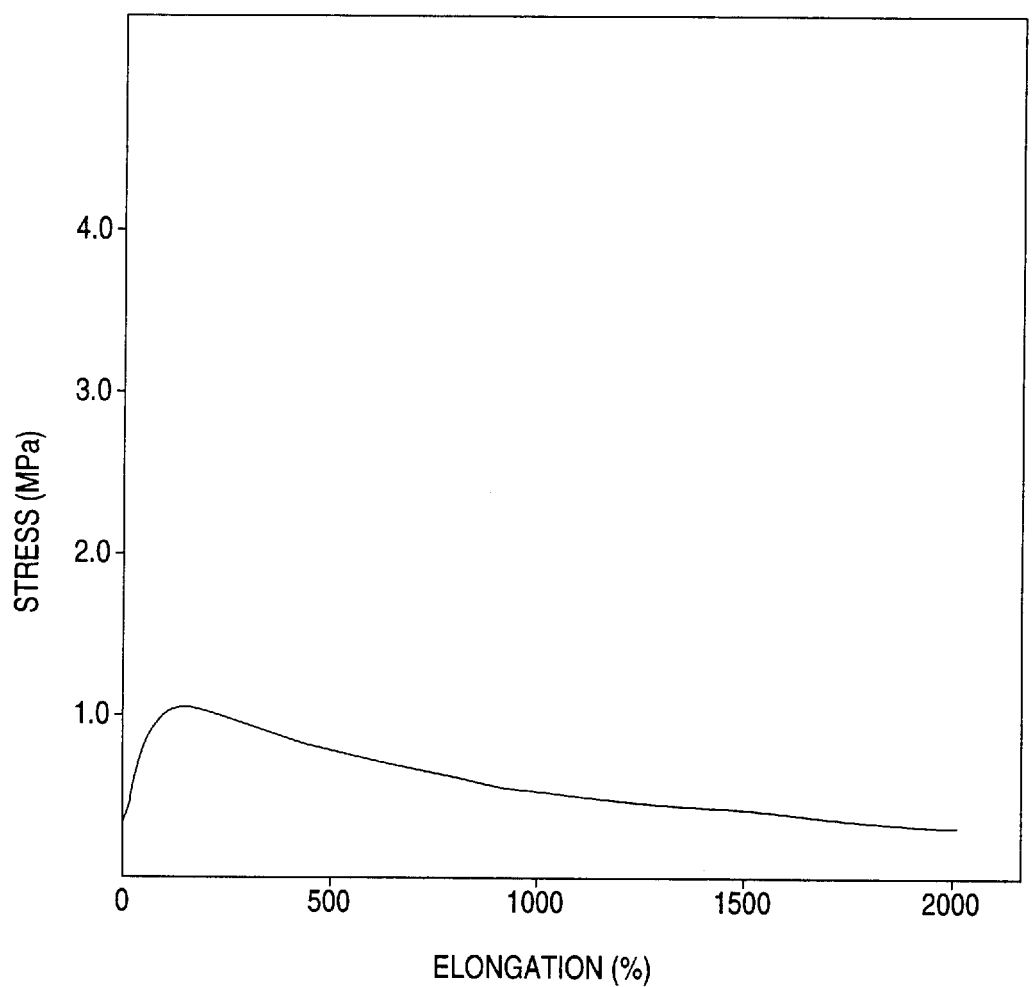
FIG. 4 shows the stress-stain curve of polypropylene produced under the conditions of Example 18.
Figure 5:
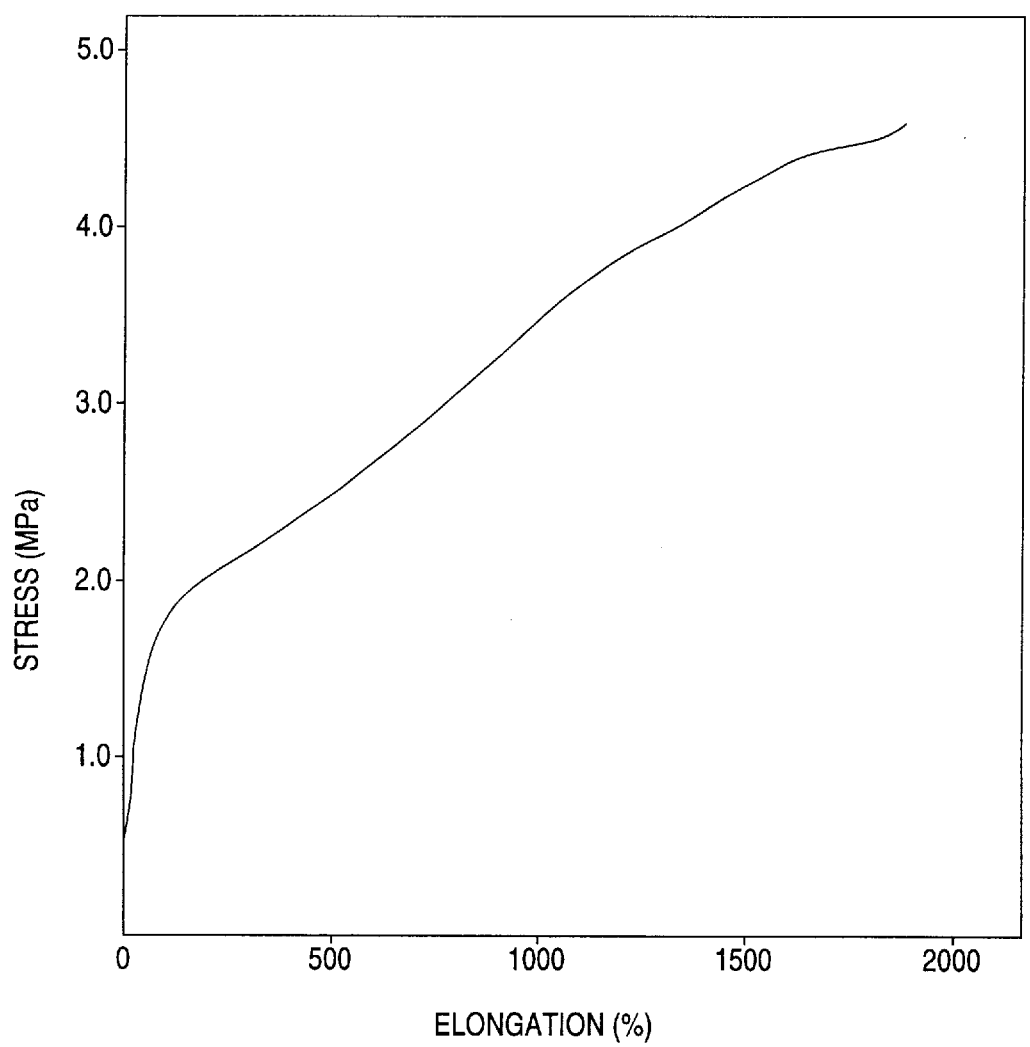
FIG. 5 shows the stress-stain curve of polypropylene produced under the conditions of Example 22.

The polypropylene products obtained in Examples 18 to 23 were then subjected to elasticity test. The results are set forth in Table 7. The stress-strain curve of polypropylenes obtained in Examples 18 and 22 are set forth in FIGS. 4 and 5, respectively.

As mentioned above, the polymerization of an olefin in the presence of a metallocene compound as an essential catalyst component provides a plurality of effects depending on the olefin to be polymerized.

In other words, in the case of the production of an ethylenic polymer, a high melt tension polymer having up to a high molecular weight can be produced.

In the case of the production of an ethylenic copolymer, a polymer having a uniform comonomer distribution can be produced up to a high molecular weight range. Further, a high percent comonomer incorporation in the polymer chain can be provided, giving an advantage in cost.

In the case of the polymerization of α-olefin, particularly propylene, an amorphous polypropylene having elastic properties can be produced at a high activity. When the polymerization is effected in the presence of the metallocene compound of the present invention combined with other metallocene compounds, the elastic properties of the polymer thus produced can be properly controlled under industrially effective polymerization conditions.

TABLE 5

|  | Metallocene 1 | Metallocene 2 | Weight (μmol) | TPFPB (ml) | TIBA (ml) | Polymerization temperature (°C.) | Yield (g) | Activity (Kg-PP/g-Zr · h) | Remarks |
|---|---|---|---|---|---|---|---|---|---|
| Example 18 | IMNFZ | — | 3.9 | 2.0 | 15.6 | 50 | 240 | 96 | elastic |
| Example 19 | IMNFZ | — | 1.7 | 0.9 | 6.8 | 20 | 54 | 32 | elastic |
| Example 20 | IMPFZ | — | 2.0 | 1.0 | 8.0 | 50 | 125 | 61 | elastic |
| Example 21 | IMPFZ | — | 1.4 | 0.7 | 5.6 | 20 | 38 | 28 | elastic |
| Comparative Example 15 | a | 1.6 | 0.8 | 6.4 | 20 | 20 | 17 | 22 | oily |
| Comparative Example 16 | g | — | 1.7 | 0.9 | 6.8 | 20 | 19 | 21 | powder |
| Example 22 | IHNFZ | h | 2.8 | 1.4 | 11.2 | 60 | 72 | 40 | elastic |
| Example 23 | IMNFZ | h | 3.5 | 1.8 | 14.0 | 70 | 78 | 35 | elastic |

TABLE 6

|  | mm (%) | mr (%) | rr (%) | Mw (×10⁻³) | Mw/Mn | Tm (°C.) | ΔH (J · g⁻¹) |
|---|---|---|---|---|---|---|---|
| Example 18 | 17 | 47 | 36 | 593 | 2.8 | — | — |
| Example 19 | 17 | 45 | 38 | 853 | 2.8 | — | — |
| Example 20 | 16 | 46 | 38 | 493 | 2.5 | — | — |
| Example 21 | 16 | 44 | 40 | 793 | 2.5 | — | — |
| Comparative Example 15 | 27 | 33 | 40 | 5.0 | 2.8 | — | — |
| Comparative Example 16 | 78 | 12 | 10 | 214 | 2.6 | 100 | 24.7 |
| Example 22 | 25 | 42 | 33 | 428 | 5.2 | 146 | 11.1 |
| Example 23 | 28 | 41 | 31 | 320 | 8.9 | 146 | 13.4 |

While the invention has been described in detail and with reference to specific examples thereof, it will be apparent to one skilled in the art that various changes and modifications can be made therein without departing from the spirit and scope thereof.

What is claimed is:

1. A process for producing a polyolefin, said process comprising the step of homopolymerizing ethylene or copolymerizing ethylene and at least one of propylene, 1-butene, 1-hexene or 1-octene, in the presence of a catalyst comprising:

(A) a catalyst component;
(B) a Lewis acid compound; and
(C) an organoaluminum compound, said catalyst component comprising a metallocene compound represented by formula (1):

TABLE 7

|  | Stress at 100% elongation (MPa) | Elongation at yield point (%) | Tensile stress at yield point (MPa) | Elongation at rupture (%) | Tensile stress at rupture (MPa) | Elongation set (%) | Internal haze (%) |
|---|---|---|---|---|---|---|---|
| Example 18 | 1.0 | 136 | 1.0 | >2,000 | <0.33 | 45 | 10.5 |
| Example 19 | 1.1 | 145 | 1.2 | >2,000 | <0.35 | 40 | 10.1 |
| Example 20 | 0.9 | 131 | 0.9 | >2,000 | <0.32 | 47 | 10.2 |
| Example 21 | 1.2 | 143 | 1.3 | >2,000 | <0.35 | 39 | 10.4 |
| Example 22 | 1.8 | — | — | 1,870 | 4.46 | 16 | 13.1 |
| Example 23 | 1.7 | — | — | 1,910 | 3.38 | 13 | 14.5 |

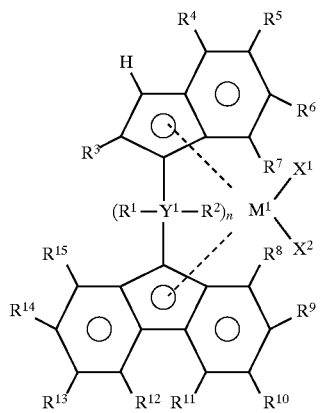

(1)

wherein $M^1$ represents a transition metal atom selected from the group consisting of Ti, Zr, and Hf;

$X^1$ and $X^2$ are the same or different and each represents a hydrogen atom, a halogen atom, a hydrocarbon group having from 1 to 20 carbon atoms which may contain a halogen atom, an OR group, an SR group, an OCOR group, an $SO_2R$ group, an $OSO_2R$ group, or an NRR' group, in which R and R' are the same or different and each represents a hydrogen atom or a hydrocarbon group having from 1 to 7 carbon atoms which may optionally contain a halogen atom;

$R^1$ and $R^2$ are the same or different and each represents a hydrogen atom, a hydrocarbon group having from 1 to 20 carbon atoms, an OR group, or an SR group, in which R represents a hydrogen atom or a hydrocarbon group having from 1 to 7 carbon atoms which may optionally contain a halogen atom, $R^1$ and $R^2$ may be connected to each other to form a ring;

$R^3$ represents a hydrocarbon group having from 1 to 5 carbon atoms which may contain a silicon atom;

$R^4$ represents an aryl group having from 6 to 20 carbon atoms which may contain a silicon atom;

$R^5$ to $R^{15}$ each represents a hydrogen atom;

$Y^1$ represents a carbon atom, a silicon atom, or a germanium atom; and n represents an integer of from 1 to 3.

2. A process for producing a polyolefin as claimed in claim 1, wherein said catalyst further comprises (D) a particulate carrier.

3. A process for producing a polyolefin as claimed in claim 1, wherein $R_4$ is a phenyl group, a tolyl group, a 2,6-dimethyl phenyl group, a 2,4,6-trimethyl phenyl group, a naphthyl group or an anthracenyl group.

4. A process for producing a polyolefin as claimed in claim 3, wherein $R_4$ is a phenyl group or a 1-naphthyl group.

5. A process for producing a polyolefin, said process comprising the step of polymerizing one of propylene, 1-butene, 1-hexene or 1-octene or copolymerizing two or more of propylene, 1-butene, 1-hexene and 1-octene, in the presence of a catalyst comprising:

(A) a catalyst component;

(B) a Lewis acid compound; and (C) an organoaluminum compound;

said catalyst component (A) comprising a metallocene compound represented by formula (1):

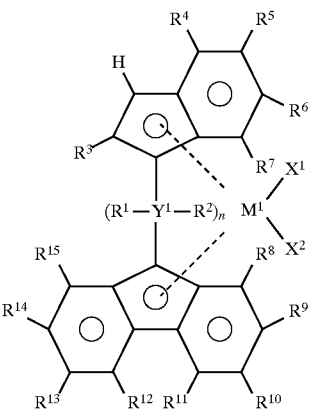

(1)

wherein $M^1$ represents a transition metal atom selected from the group consisting of Ti, Zr, and Hf;

$X^1$ and $X^2$ are the same or different and each represents a hydrogen atom, a halogen atom, a hydrocarbon group having from 1 to 20 carbon atoms which may optionally contain a halogen atom, an OR group, an SR group, an OCOR group, an $SO_2R$ group, an $OSO_2R$ group, or an NRR' group, in which R and R' are the same or different and each represents a hydrogen atom or a hydrocarbon group having from 1 to 7 carbon atoms which may optionally contain a halogen atom;

$R^1$ and $R^2$ are the same or different and each represents a hydrogen atom, a hydrocarbon group having from 1 to 20 carbon atoms, an OR group, or an SR group, in which R represents a hydrogen atom or a hydrocarbon group having from 1 to 7 carbon atoms which may contain a halogen atom, $R^1$ and $R^2$ may be connected to each other to form a ring;

$R^3$ represents a hydrocarbon group having from 1 to 5 carbon atoms which may optionally contain a silicon atom;

$R^4$ represents an aryl group having from 6 to 20 carbon atoms;

$R^5$ to $R^{15}$ are the same or different and each represents a hydrogen atom or a hydrocarbon group having from 1 to 20 carbon atoms which may optionally contain a silicon atom and optionally two of $R^5$ to $R^{15}$ are connected to each other to form a ring;

$Y^1$ represents a carbon atom, a silicon atom, or a germanium atom; and n represents an integer of from 1 to 3.

6. A process for producing a polyolefin as claimed in claim 5, wherein said catalyst further comprises (D) a particulate carrier.

7. A process for producing a polyolefin as claimed in claim 5, wherein $R_4$ is a phenyl group, a tolyl group, a 2,6-dimethyl phenyl group, a 2,4,6-trimethyl phenyl group, a naphthyl group or an anthracenyl group.

8. A process for producing a polyolefin as claimed in claim 7, wherein $R_4$ is a phenyl group or a 1-naphthyl group.

9. A process for producing a polyolefin as claimed in claim 5, wherein said process comprises polymerizing propylene.

10. A process for producing a polyolefin, said process comprising the step of polymerizing one of propylene, 1-butene, 1-hexene or 1-octene or copolymerizing two or more of propylene, 1-butene, 1-hexene and 1-octene, in the presence of a catalyst comprising:

(A-1) a catalyst component;

(A-2) an auxiliary metallocene compound;

(B) a Lewis acid compound; and (C) an organoaluminum compound;

said catalyst component (A-1) comprising a metallocene compound represented by formula (1):

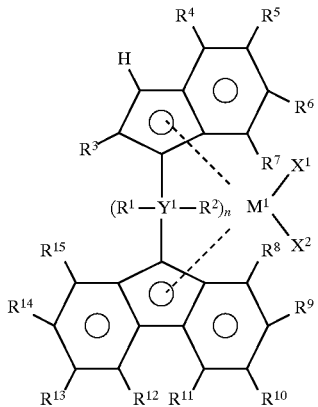
(1)

wherein $M^1$ represents a transition metal atom selected from the group consisting of Ti, Zr, and Hf;

$X^1$ and $X^2$ are the same or different and each represents a hydrogen atom, a halogen atom, a hydrocarbon group having from 1 to 20 carbon atoms which may optionally contain a halogen atom, an OR group, an SR group, an OCOR group, an $SO_2R$ group, an $OSO_2R$ group, or an NRR' group, in which R and R' are the same or different and each represents a hydrogen atom or a hydrocarbon group having from 1 to 7 carbon atoms which may optionally contain a halogen atom;

$R^1$ and $R^2$ are the same or different and each represents a hydrogen atom, a hydrocarbon group having from 1 to 20 carbon atoms, an OR group, or an SR group, in which R represents a hydrogen atom or a hydrocarbon group having from 1 to 7 carbon atoms which may optionally contain a halogen atom, $R^1$ and $R^2$ may be connected to each other to form a ring;

$R^3$ represents a hydrocarbon group having from 1 to 5 carbon atoms which may optionally contain a silicon atom;

$R^4$ represents an aryl group having from 6 to 20 carbon atoms;

$R^5$ to $R^{15}$ are the same or different and each represents a hydrogen atom or a hydrocarbon group having from 1 to 20 carbon atoms which may optionally contain a silicon atom and optionally two of $R^5$ to $R^{15}$ are connected to each other to form a ring;

$Y^1$ represents a carbon atom, a silicon atom, or a germanium atom; and n represents an integer of from 1 to 3, and said auxiliary metallocene compound (A-2) being represented by formula (3) or (4):

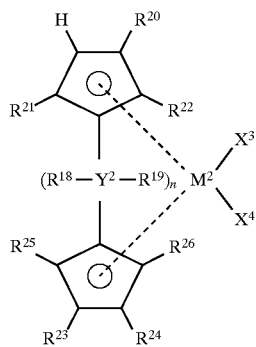
(3)

wherein $M^2$ represents a transition metal atom selected from the group consisting of Ti, Zr, and Hf;

$X^3$ and $X^4$ are the same or different and each represents a hydrogen atom, a halogen atom, a hydrocarbon group having from 1 to 20 carbon atoms which may optionally contain a halogen atom, an OR group, an SR group, an OCOR group, an $SO_2R$ group, an $OSO_2R$ group, or an NRR' group, in which R and R' are the same or different and each represents a hydrogen atom or a hydrocarbon group having from 1 to 7 carbon atoms which may contain a halogen atom;

$R^{18}$ and $R^{19}$ are the same or different and each represents a hydrogen atom, a hydrocarbon group having from 1 to 20 carbon atoms, an OR group, or an SR group, in which R represents a hydrogen atom or a hydrocarbon group having from 1 to 7 carbon atoms which may contain a halogen atom, and $R^{18}$ and $R^{19}$ optionally may be connected to each other to form a ring;

$R^{24}$ represents a hydrocarbon group having from 1 to 5 carbon atoms which may optionally contain a silicon atom;

$R^{20}$ to $R^{23}$, $R^{25}$, and $R^{26}$ are the same or different and each represents a hydrogen atom or a hydrocarbon group having from 1 to 20 carbon atoms which may optionally contain silicon atom, $R^{23}$ and $R^{25}$, and optionally $R^{24}$ and $R^{26}$ may be connected to each other via a carbon atom to form a ring;

$Y^2$ represents a carbon atom, a silicon atom, or a germanium atom; and n represents an integer of from 1 to 3,

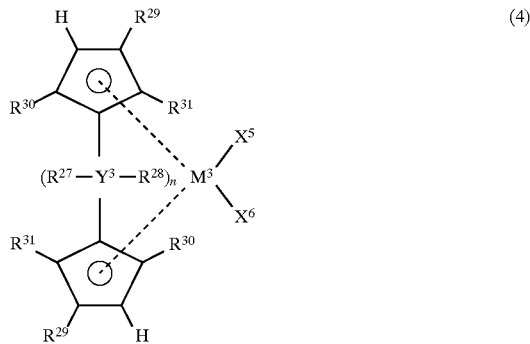
(4)

wherein $M^3$ represents a transition metal atom selected from the group consisting of Ti, Zr, and Hf;

$X^5$ and $X^6$ are the same or different and each represents a hydrogen atom, a halogen atom, a hydrocarbon group having from 1 to 20 carbon atoms which may contain halogen atom, an OR group, and SR group, an OCOR group, an $SO_2R$ group, an $OSO_2R$ group, or an NRR' group, in which R and R' are as defined above;

$R^{27}$ and $R^{28}$ are the same or different and each represents a hydrogen atom, a hydrocarbon group having from 1 to 20 carbon atoms, an OR group, or an SR group, in which R is as defined above, and optionally $R^{27}$ and $R^{28}$ may be connected to each other to form a ring;

$R^{29}$ represents a hydrocarbon group having from 1 to 5 carbon atoms which may optionally contain a silicon atom;

$R^{30}$ and $R^{31}$ are the same or different and each represents a hydrogen atom or a hydrocarbon group having from 1 to 20 carbon atoms which may optionally contain a silicon atom;

optionally $R^{29}$ and $R^{31}$ may be connected to each other via a carbon atom to form a ring;

$Y^3$ represents a carbon atom, a silicon atom, or a germanium atom; and n represents an integer of from 1 to 3.

11. A process for producing a polyolefin as claimed in claim 10, wherein said catalyst further comprises (D) a particulate carrier.

12. A process for producing a polyolefin as claimed in claim 10, wherein $R_4$ is a phenyl group, a tolyl group, a 2,6-dimethyl phenyl group, a 2,4,6-trimethyl phenyl group, a naphthyl group or an anthracenyl group.

13. A process for producing a polyolefin as claimed in claim 12, wherein $R_4$ is a phenyl group or a 1-naphthyl group.

14. A process for producing a polyolefin as claimed in claim 10, wherein said process comprises polymerizing propylene.

* * * * *